(12) United States Patent
Kim et al.

(10) Patent No.: US 10,317,956 B2
(45) Date of Patent: Jun. 11, 2019

(54) TRAY DEVICE AND ELECTRONIC DEVICE HAVING THE SAME

(71) Applicant: Samsung Electronics Co., Ltd, Gyeonggi-do (KR)

(72) Inventors: Jungtae Kim, Gyeonggi-do (KR);
Hyukjae Jang, Seoul (KR);
Byoung-Uk Yoon, Gyeonggi-do (KR);
Jong-Chul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 15/289,069

(22) Filed: Oct. 7, 2016

(65) Prior Publication Data
US 2017/0102742 A1   Apr. 13, 2017

(30) Foreign Application Priority Data
Oct. 8, 2015   (KR) .................... 10-2015-0141738

(51) Int. Cl.
*G06F 1/18* (2006.01)
*H04M 1/02* (2006.01)
(Continued)

(52) U.S. Cl.
CPC ............ *G06F 1/185* (2013.01); *G06F 1/1656* (2013.01); *H04B 1/3816* (2013.01); *H04M 1/02* (2013.01); *H04M 1/026* (2013.01)

(58) Field of Classification Search
CPC ...... G06F 1/185; G06F 1/1656; H04M 1/026; H04M 1/02; H04B 1/3816
(Continued)

(56) References Cited

U.S. PATENT DOCUMENTS 8,622,646 B2 *  1/2014  Quan ................... H05K 5/0239
                                                      361/679.39
8,725,198 B2     5/2014  Wang et al.
(Continued)

FOREIGN PATENT DOCUMENTS

JP    3189283 B2   7/2001
JP    3189284 B2   7/2001
(Continued)

OTHER PUBLICATIONS

The International Searching Authority, "International Search Report," International Application No. PCT/KR2016/010179, Nov. 29, 2016, 3 pages, publisher The ISA/KR, International Application Division, Korean Intellectual Property Office, Daejeon, Republic of Korea.
(Continued)

*Primary Examiner* — Rockshana D Chowdhury

(57) ABSTRACT

According to various embodiments, an electronic device having a housing including three surfaces at least partially surrounding a space between a first and second surface, an opening formed to one portion of a side surface of the housing, and the portion extending to define a hole connected to the opening. The device includes a tray with four side surfaces and having a length capable of being entirely inserted into the hole, and detachable from the hole. The device further including a fixing structure disposed inside the hole in parallel with one side surface of the tray, and at least partially rotatable about an axis in a first direction about the hole. When inserted entirely into the hole, at least one portion of the tray contacts the fixing structure, and if the fixing structure at least partially rotates in the first direction, the tray is released from the hole.

16 Claims, 31 Drawing Sheets

(51) Int. Cl.
*G06F 1/16* (2006.01)
*H04B 1/3816* (2015.01)

(58) Field of Classification Search
USPC ...................................... 361/679.38
See application file for complete search history.

(56) References Cited

U.S. PATENT DOCUMENTS

| | | | |
|---|---|---|---|
| 8,777,669 B2 | 7/2014 | Hu et al. | |
| 9,459,663 B2* | 10/2016 | Wang | G06F 1/1658 |
| 2012/0168517 A1* | 7/2012 | Lee | H01Q 1/243 |
| | | | 235/492 |
| 2012/0276764 A1 | 11/2012 | Nakase et al. | |
| 2013/0005166 A1 | 1/2013 | Lim et al. | |
| 2013/0044438 A1* | 2/2013 | Tang | G06K 13/08 |
| | | | 361/737 |
| 2014/0009895 A1 | 1/2014 | Wang | |
| 2014/0055925 A1* | 2/2014 | Hsu | H05K 7/1417 |
| | | | 361/679.01 |
| 2014/0247568 A1* | 9/2014 | Lin | H04B 1/3818 |
| | | | 361/754 |

FOREIGN PATENT DOCUMENTS

| | | |
|---|---|---|
| JP | 2014-007094 | 1/2014 |
| JP | 3189283 U | 2/2014 |
| JP | 3189284 U | 2/2014 |

OTHER PUBLICATIONS

The International Searching Authority, "Written Opinion," International Application No. PCT/KR2016/010179, Nov. 29, 2016, 8 pages, publisher The ISA/KR, International Application Division, Korean Intellectual Property Office, Daejeon, Republic of Korea.

* cited by examiner

TRAY DEVICE AND ELECTRONIC DEVICE HAVING THE SAME

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Oct. 8, 2015 and assigned Serial No. 10-2015-0141738, the entire disclosure of which is hereby incorporated by reference.

TECHNICAL FIELD

Various embodiments of the present disclosure relate to an electronic device, and in particular, to a tray device and an electronic device including the same.

BACKGROUND

While functions of portable electronic devices have recently been diversified, a device which is advantageous in portability can have a much higher compatibility. For example, even if electronic devices have the same function, an electronic device which is slimmer, lighter, thinner, and simpler can be preferred. Therefore, manufacturers of the electronic devices compete with each other to develop a device slimmer, lighter, thinner, and simpler than other products while having the same or more advanced functions.

As one way of such a trend, the electronic device has external components selectively or necessarily applied therein. Such external components have been gradually becoming smaller, and an interface device capable of recognizing the external components applied to the electronic device also has been becoming smaller.

For example, such external components may be represented as a card-type external component such as a memory card capable of expanding a storage space of the electronic device, a Subscriber Identification Module (SIM) card (so-called a 'SIM card') installed to one electronic device in a detachable manner so as to be used by a plurality of users authenticated in different ways, and the like. There is an effort to effectively apply such external components to the electronic device.

SUMMARY

To address the above-discussed deficiencies, it is a primary object of the instant disclosure to provide an electronic device including a tray according to various embodiments described herein. External components applied to an electronic device in a detachable manner may be electrically connected to the electronic device by being placed to a socket disposed inside the electronic device to place the external component, and may have a structure in which a tray capable of applying the external component is used so that the external component is electrically connected to the electronic device by performing only an operation of placing the tray to the socket.

According to various exemplary embodiments, when an external component is applied to an electronic device in a tray manner, a tray device may include a fixing structure for fixing the tray completely placed to the electronic device and an unloading structure for unloading the placed tray from the electronic device. According to one exemplary embodiment, the legacy tray device occupies a relatively large space since the fixing structure and the unloading structure are separately implemented, which may cause a problem of going against a trend in which the electronic device becomes increasingly slim.

According to various exemplary embodiments, a tray may include a tray body for containing an external device (e.g., a card-type external device or the like) and inserted to a socket disposed inside the electronic device, and a tray cover disposed to an end portion of the tray body to close a tray inserting opening when the tray is completely placed to the electronic device. According to one exemplary embodiment, due to a manufacturing tolerance of a socket fixed to a proper position inside the electronic device and the tray inserting opening formed to a housing of the electronic device, a tray to be placed may be placed such that the tray cover is eccentric to the opening. As a result, a good external appearance of the electronic device may be impaired, and the tray may be erroneously detached.

According to various embodiments of the present disclosure, an electronic device may include a housing including a first surface, a second surface facing an opposite direction of the first surface, and a side surface at least partially surrounding a space between the first surface and the second surface. A portion of the side surface of the housing may extend outwardly and define an opening formed therein, wherein the opening may be formed to define a hole connected to the opening. Further, a tray including a first side surface, a second side surface facing an opposite direction of the first side surface, a third side surface extended between the first side surface and the second side surface, and a fourth side surface facing an opposite direction of the third side surface and extended between the first side surface and the second side surface, having a length capable of being entirely inserted into the hole, and detachable from the hole, and a first fixing structure disposed inside the hole actually in parallel with at least one of the first side surface or the second side surface of the tray, and configured to be at least partially rotatable about an axis in a first direction facing the outside of the hole. In an embodiment of the disclosure, the tray may be configured such that, if inserted entirely into the hole, at least one portion of the tray is in contact with the first fixing structure, and the second side surface of the tray is aligned with the same surface of another portion of the side surface of the housing, and if the first fixing structure at least partially rotates in the first direction, the tray is released from the hole.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
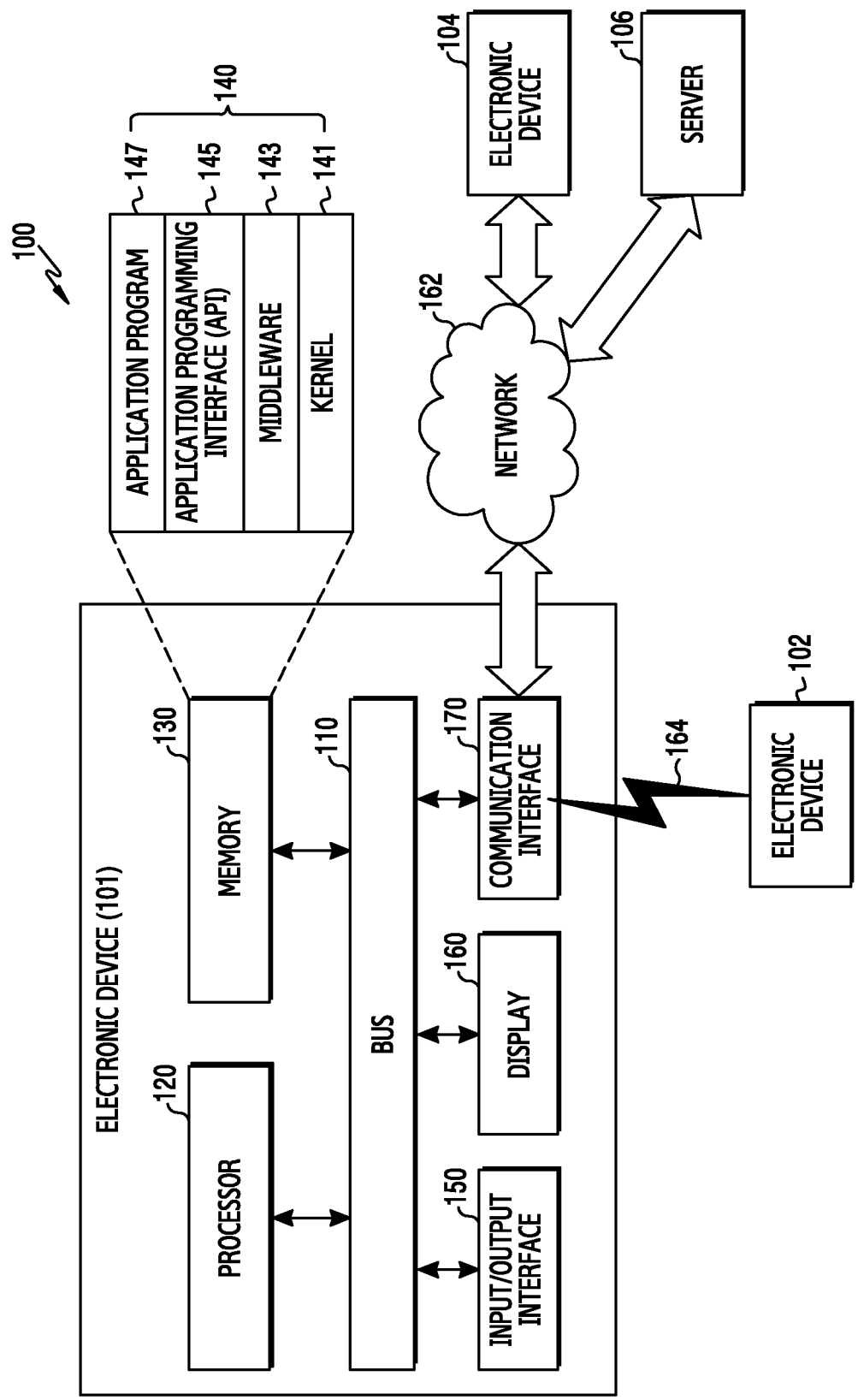
FIG. 1 illustrates a network environment including an electronic device according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of certain embodiments of the present disclosure as defined by the claims and their equivalents. It includes specific details to assist in that understanding but these are to be regarded merely as examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "include" and "may include" used herein are intended to indicate the presence of a corresponding function, operation, or constitutional element disclosed herein, and are not intended to limit the presence of one or more functions, operations, or constitutional elements. In addition, the terms "include" and "have" are intended to indicate that characteristics, numbers, operations, constitutional elements, and elements disclosed in the specification or combinations thereof exist. However, additional possibilities of one or more other characteristics, numbers, operations, constitutional elements, elements or combinations thereof may exist.

As used herein, the expression "or" includes any and all combinations of words enumerated together. For example, "A or B" may include either A or B or may include both A and B.

Although expressions used in various embodiments of the present disclosure, such as "$1^{st}$", "$2^{nd}$", "first", "second" may be used to express various constituent elements of the various embodiments of the present disclosure, these expressions are not intended to limit the corresponding constituent elements. For example, the above expressions are not intended to limit an order or an importance of the corresponding constituent elements. The above expressions may be used to distinguish one constituent element from another constituent element. For example, a first user device and the second user device are both user devices, and indicate different user devices. For example, a first constituent element may be referred to as a second constituent element, and similarly, the second constituent element may be referred to as the first constituent element without departing from the scope of the present disclosure.

When an element is mentioned as being "connected" to or "accessing" another element, this may mean that it is directly connected to or accessing the other element, or there may be intervening elements present between the two elements. On the other hand, when an element is mentioned as being "directly connected" to or "directly accessing" another element, it is to be understood that there are no intervening elements present.

The term "module" as used herein may imply a unit including one of hardware, software, and firmware, or a combination thereof. The term "module" may be interchangeably used with terms, such as unit, logic, logical block, component, circuit, and the like. A module as described herein may be a minimum unit of an integrally constituted component or may be a part thereof. The module may be a minimum unit for performing one or more functions or may be a part thereof. The module may be mechanically or electrically implemented. For example, the module as described herein includes at least one of an application-specific IC (ASIC) chip, a field-programmable gate arrays (FPGAs), and a programmable-logic device, which are known or will be developed and which may perform certain operations.

By the term "substantially" it is meant that the recited characteristic, parameter, or value need not be achieved exactly, but that deviations or variations, including, but not limited to, for example, tolerances, measurement errors, measurement accuracy limitations and other factors known to persons of ordinary skill in the art, may occur in amounts that do not preclude the effect the characteristic was intended to provide.

Unless otherwise defined, all terms, including technical and scientific terms, used herein have the same meaning as commonly understood by those of ordinary skill in the art to which various embodiments of the present disclosure belong. It will be further understood that terms, such as those defined in commonly used dictionaries, should be interpreted as having meanings that are consistent with their meaning in the context of the relevant art and the various embodiments of the present disclosure, and should not be interpreted in an idealized or overly formal sense unless expressly so defined herein.

An electronic device as used herein may be a device including, but not limited to, an antenna capable of performing a communication function in at least one frequency band. For example, the electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a mobile medical device, a camera, and a wearable device (e.g., a head-mounted-device (HMD), such as electronic glasses, electronic clothes, an electronic bracelet, an electronic necklace, an electronic appcessory, an electronic tattoo, a smart watch, and/or the like).

The electronic device may be a smart home appliance having an antenna. For example, the smart home appliance may include at least one of a television (TV), a digital versatile disc (DVD) player, an audio player, a refrigerator, an air conditioner, a cleaner, an oven, a microwave oven, a washing machine, an air purifier, a set-top box, a TV box (e.g., Samsung HomeSync®, Apple TV®, or Google TV®), a game console, an electronic dictionary, an electronic key, a camcorder, and an electronic picture frame.

The electronic device may include an antenna and may be or include one of various medical devices (e.g., magnetic resonance angiography (MRA), magnetic resonance imaging (MRI), computed tomography (CT), imaging equipment, an ultrasonic instrument, and the like), a navigation device, a global positioning system (GPS) receiver, an event data recorder (EDR), a flight data recorder (FDR), a car infotainment device, electronic equipment for a ship (e.g., a vessel navigation device, a gyro compass, and the like), avionics, a security device, a car head unit, an industrial or domestic robot, an automatic teller machine (ATM), a point of sales (POS) device, and the like.

The electronic device may be part of at least one of an item of furniture or a building/structure including an antenna. The electronic device may be an electronic board, an electronic signature input device, a projector, or any of various measurement machines (e.g., water supply, electricity, gas, a propagation measurement machine, and the like).

The electronic device may be one or more combinations of the aforementioned various devices. In addition, the electronic device may be a flexible device. Moreover, the electronic device is not limited to the aforementioned devices.

Hereinafter, an electronic device according to various embodiments will be described with reference to the accompanying drawings. The term 'user' used in the various embodiments may refer to a person who uses the electronic device or a device which uses the electronic device (e.g., an artificial intelligence (AI) electronic device).

FIG. 1 illustrates a view of a network environment 100 including an electronic device, according to an embodiment of the present disclosure.

Referring to FIG. 1, the electronic device 101 may include a bus 110, a processor 120, a memory 130, an input/output interface 150, a display 160, and/or a communication interface 170. In various embodiments of the present disclosure, the electronic device 101 can omit at least one of the components or further include another component(s).

The bus 110 may include a circuit for connecting the components (e.g., the processor 120, the memory 130, the input/output interface 150, the display 160, and the communication interface 170) and delivering communications (e.g., a control message) therebetween.

The processor 120 may include one or more of a central processing unit (CPU), an application processor (AP), and a communication processor (CP). The processor 120 processes an operation or data on control of and/or communication with another component of the electronic device 101.

The processor 120, which is connected to the LTE network, may determine whether a call is connected over the CS service network using caller identification information (e.g., a caller phone number) of the CS service network (e.g., the 2G/3G network). For example, the processor 120 may receive incoming call information (e.g., a CS notification message or a paging request message) of the CS service network over the LTE network (e.g., circuit-switched fallback (CSFB)). For example, the processor 120 being connected to the LTE network may receive incoming call information (e.g., a paging request message) over the CS service network (e.g., single radio LTE (SRLTE)).

When receiving the incoming call information (e.g., a CS notification message or a paging request message) of the CS service network over the LTE network, the processor 120 may obtain caller identification information from the incoming call information. The processor 120 displays the caller identification information on the display 160. The processor 120 determines whether to connect the call based on input information corresponding to the caller identification information displayed on the display 160. For example, when detecting input information corresponding to an incoming call rejection, through the input/output interface 150, the processor 120 may restrict the voice call connection and maintains the LTE network connection. For example, when detecting input information corresponding to an incoming call acceptance, through the input/output interface 150, the processor 120 connects the voice call by connecting to the CS service network.

When receiving the incoming call information (e.g., a CS notification message or a paging request message) of the CS service network over the LTE network, the processor 120 obtains caller identification information from the incoming call information. The processor 120 may determine whether to connect the call by comparing the caller identification information with a reception control list. For example, when the caller identification information is included in a first reception control list (e.g., a blacklist), the processor 120 restricts the voice call connection and maintains the connection to the LTE network. For example, when the caller identification information is not included in the first reception control list (e.g., the blacklist), the processor 120 may connect the voice call by connecting to the CS service network. For example, when the caller identification information is included in a second reception control list (e.g., a white list), the processor 120 may connect the voice call by connecting to the CS service network.

When receiving the incoming call information (e.g., a paging request message) of the CS service network over the LTE network, the processor 120 may send an incoming call response message (e.g., a paging response message) to the CS service network. The processor 120 may suspend the LTE service and receive the caller identification information (e.g., a Circuit-switched Call (CC) setup message) from the CS service network. The processor 120 determines whether to connect the call by comparing the caller identification information with the reception control list. For example, when the caller identification information may be included in the first reception control list (e.g., the blacklist), the processor 120 may restrict the voice call connection and resume the LTE network connection. For example, when the caller identification information is not included in the first reception control list (e.g., the blacklist), the processor 120 may connect the voice call by connecting to the CS service network. For example, when the caller identification information is included in the second reception control list (e.g., the white list), the processor 120 may connect the voice call by connecting to the CS service network.

The memory 130 can include volatile and/or nonvolatile memory. The memory 130 may store commands and/or data (e.g., the reception control list) relating to at least another component of the electronic device 101. The memory 130 may store software and/or a program 140. The program 140 may include, for example, a kernel 141, middleware 143, an application programming interface (API) 145, and/or application programs (or "applications") 147. At least some of the kernel 141, the middleware 143, and/or the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the applications 147). Furthermore, the kernel 141 provides an interface through which the middleware 143, the API 145, or the applications 147 connects the individual elements of the electronic device 101 to control or manage the system resources.

The middleware 143 may function as an intermediary for allowing the API 145 or the applications 147 to communicate with the kernel 141 to exchange data.

In addition, the middleware 143 may process one or more task requests received from the applications 147 according to priorities thereof. For example, the middleware 143 assigns priorities for using the system resources (e.g., the bus 110, the processor 120, the memory 130, etc.) of the electronic device 101, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (e.g., an instruction) for file control, window control, image processing, text control, etc.

The input/output interface 150 functions as an interface that transfers instructions or data input from a user or another external device to the other element(s) of the electronic device 101. Furthermore, the input/output interface 150 may output the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content (e.g., a text, images, videos, icons, symbols, etc.) for the user. The display 160 may include a touch screen and may be responsive to, for example, a touch, a gesture, proximity, a hovering input, etc., using an electronic pen or the user's body part. The display 160 may display, for example, a web page.

The communication interface 170 can establish a communication between the electronic device 101 and an external electronic device (e.g., a first external electronic device 102, a second external electronic device 104, or a server 106). For example, the communication interface 170 can communicate with the first external electronic device 102, the second external electronic device 104, or the server 106 in connection to the network 162 through wireless communication or wired communication. For example, the wireless communication can conform to a cellular communication protocol including at least one of LTE, LTE-Advanced (LTE-A), CDMA, WCDMA, universal mobile telecommunication system (UMTS), WiBro, and GSM.

The wired communication can include at least one of universal serial bus (USB), high definition multimedia interface (HDMI), recommended standard 232 (RS-232), and plain old telephone service (POTS).

The network 162 can include at least one of telecommunications networks, for example, a computer network (e.g., local area network (LAN) or wide area network (WAN)), Internet, and a telephone network.

The electronic device 101 may provide the LTE service in the single radio environment by use of at least one module functionally or physically separated from the processor 120. Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member may be formed of a single material.

Each of the first and second external electronic devices 102 and 104 may be a type of device that is the same as or different from the electronic device 101. According to one embodiment, the server 106 may include a group of one or more servers. According to various embodiments, all or some of the operations to be executed by the electronic device 101 may be executed by another electronic device or a plurality of other electronic devices (e.g., the electronic devices 102 and 104 or the server 106).

According to one embodiment, in the case where the electronic device 101 may perform a certain function or service automatically or by request, the electronic device 101 may request some functions that are associated therewith from the other electronic devices (e.g., the electronic devices 102 and 104 or the server 106) instead of or in addition to executing the function or service by itself. The other electronic devices (e.g., the electronic devices 102 and 104 or the server 106) may execute the requested functions or additional functions, and may transmit the results to the electronic device 101. The electronic device 101 may provide the requested functions and/or services by processing the received results. For this purpose, for example, a cloud computing technique, a distributed computing technique, or a client-server computing technique may be used.

Figure 2:
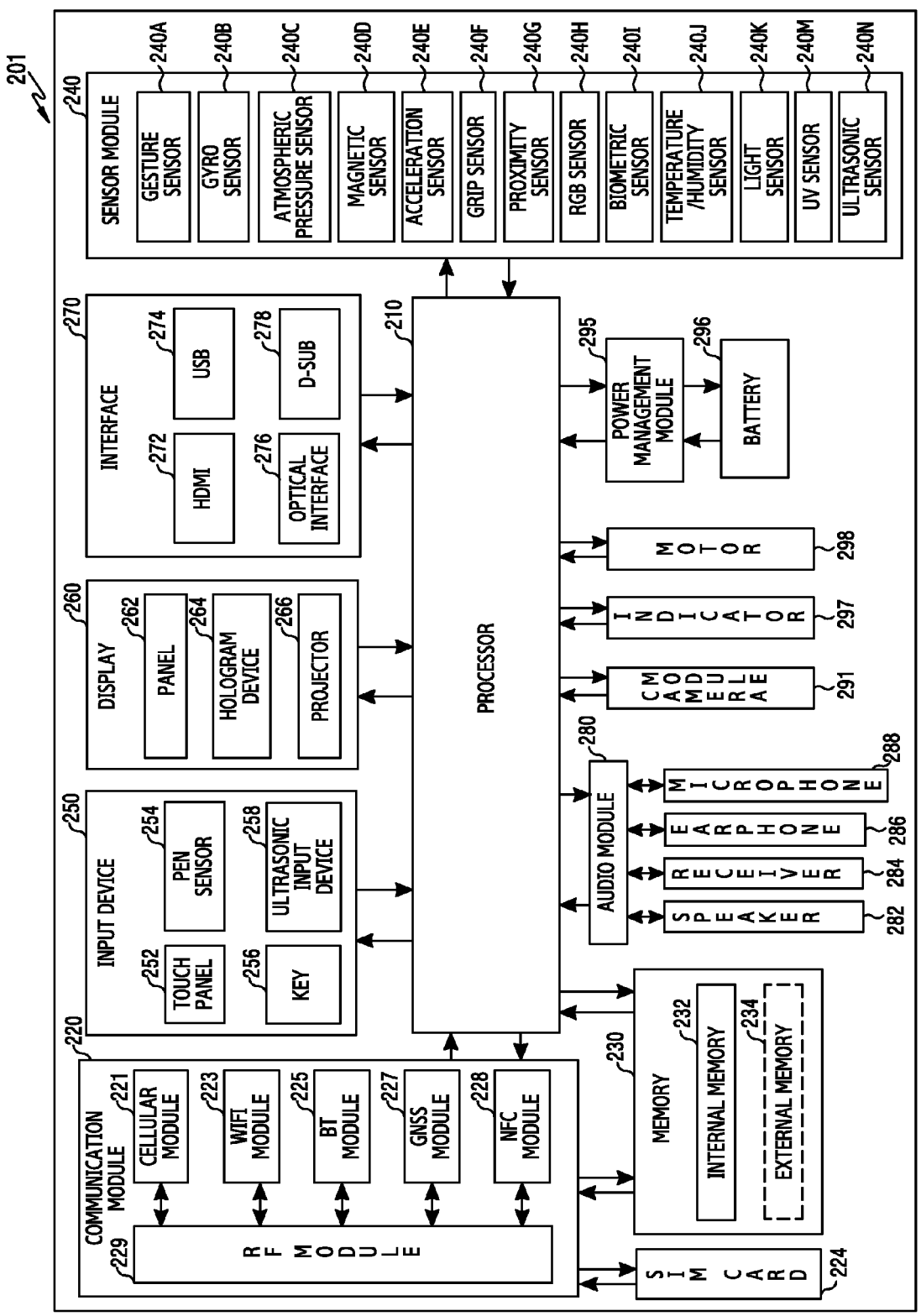
FIG. 2 is a block diagram that illustrates an electronic device according to various embodiments of the present disclosure.

FIG. 2 illustrates a diagram of a configuration of an electronic device 201, according to an embodiment of the present disclosure.

Referring to FIG. 2, a configuration of the electronic device 201 is provided. The electronic device 201 may include all or some of the components described with reference to the electronic device 101 of FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and/or a motor 298.

The AP 210 may control a plurality of hardware or software elements connected to the AP 210 by driving an operating system (OS) or an application program. The AP 210 processes a variety of data, including multimedia data, and performs arithmetic operations. The AP 210 may be implemented, for example, with a system on chip (SoC). The AP 210 may further include a graphical processing unit (GPU).

The communication module 220 may perform data transmission/reception in communication between the external electronic device 104 or the server 106 which may be connected with the electronic device 201 through the network 162. The communication module 220 includes a cellular module 221, a Wi-Fi module 223, a BT module 225, a global navigation satellite system (GNSS) or GPS module 227, a NFC module 228, and a radio frequency (RF) module 229.

The cellular module 221 provides a voice call, a video call, a text service, an internet service, and the like, through a communication network (e.g., LTE, LTE-A, CDMA, WCDMA, UMTS, WiBro, and GSM, and the like). In addition, the cellular module 221 may identify and authenticate the electronic device 201 within the communication network by using the SIM card 224. The cellular module 221 may perform at least some of functions that can be provided by the AP 210. For example, the cellular module 221 may perform at least some multimedia control functions.

The cellular module 221 may include a communication processor (CP). Further, the cellular module 221 may be implemented, for example, with an SoC. Although elements, such as the cellular module 221 (e.g., the CP), the memory 230, and the power management module 295 are illustrated as separate elements with respect to the AP 210 in FIG. 2, the AP 210 may also be implemented such that at least one part (e.g., the cellular module 221) of the aforementioned elements is included in the AP 210.

The AP 210 or the cellular module 221 loads an instruction or data, which is received from each non-volatile memory connected thereto or at least one of different elements, to a volatile memory and processes the instruction or data. In addition, the AP 210 or the cellular module 221 stores data, which may be received from at least one of different elements or generated by at least one of different elements, into the non-volatile memory.

Each of the Wi-Fi module 223, the BT module 225, the GNSS module 227, and/or the NFC module 228 may include a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least some (e.g., two or more) of the cellular module 221, the Wi-Fi module 223, the BT module 225, the GNSS module 227, and the NFC module 228 may be included in one integrated chip (IC) or IC package. For example, at least some processors corresponding to the cellular module 221, the Wi-Fi module 223, the BT module 225, the GNSS module 227, and the NFC module 228 (e.g., a communication processor corresponding to the cellular module 221 and a Wi-Fi processor corresponding to the Wi-Fi module 223) may be implemented with an SoC.

The RF module 229 may transmit/receive data, for example an RF signal. The RF module 229 may include, for example, a transceiver, a power amp module (PAM), a frequency filter, a low noise amplifier (LNA), and the like. In addition, the RF module 229 may further include a component for transmitting/receiving a radio wave on a free space in wireless communication, for example, a conductor, a conducting wire, and the like. Although it is illustrated in FIG. 2 that the cellular module 221, the Wi-Fi module 223, the BT module 225, the GNSS module 227, and the NFC module 228 share one RF module 229, a at least one of the cellular module 221, the Wi-Fi module 223, the BT module 225, the GNSS module 227, the NFC module 228 may transmit/receive an RF signal via a separate RF module.

The SIM card 224 may be inserted into a slot formed at a specific location of the electronic device 201. The SIM card 224 includes unique identification information (e.g., an integrated circuit card identifier (ICCID)) or subscriber information (e.g., an international mobile subscriber identity (IMSI)).

The memory 230 includes an internal memory 232 or an external memory 234.

The internal memory 232 may include, for example, at least one of a volatile memory (e.g., a dynamic random access memory (DRAM), a static RAM (SRAM), a synchronous dynamic RAM (SDRAM), and the like) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like). The internal memory 232 may be a solid state drive (SSD).

The external memory 234 may include a flash drive, and may further include, for example, compact flash (CF), secure digital (SD), micro-SD, mini-SD, extreme digital (xD), memory stick, and the like. The external memory 234 may be operatively coupled to the electronic device 201 via various interfaces.

The electronic device 201 may further include a storage unit (or a storage medium), such as a hard drive.

The sensor module 240 may measure a physical quantity or detect an operation state of the electronic device 201, and may convert the measured or detected information into an electric signal. The sensor module 240 may include, for example, at least one of a gesture sensor 240A, a gyro sensor 240B, a barometric pressure sensor or air sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination/illuminance sensor or light sensor 240K, an ultraviolet (UV) sensor 240M and ultrasonic sensor 240N.

The ultrasonic sensor 240N may include at least one ultrasonic transducer. The ultrasonic sensor 240N may include a contact type ultrasonic transducer (for example, an enclosed type ultrasonic transducer) and a non-contact type ultrasonic transducer (for example, a resonant type ultrasonic transducer), each of which are described in greater detail below. The contact type ultrasonic transducer and the non-contact type ultrasonic transducer may be controlled to be exclusively or simultaneously operated under a control of the processors 120, 220.

Additionally or alternatively, the sensor module 240 may include, for example, an E-node sensor, an electromyography (EMG) sensor, an electroencephalogram (EEG) sensor, an electrocardiogram (ECG) sensor, a fingerprint sensor, and/or the like.

The sensor module 240 may further include a control circuit for controlling at least one or more sensors included therein.

The input device 250 may include a touch panel 252, a (digital) pen sensor 254, a key 256, and/or an ultrasonic input unit 258.

The touch panel 252 may recognize a touch input, for example, by using at least one of an electrostatic type configuration, a pressure-sensitive type configuration, and/or an ultrasonic type configuration. The touch panel 252 may further include a control circuit. In the case where the touch panel is of the electrostatic type, not only is physical contact recognition possible, but proximity recognition is also possible. The touch panel 252 may further include a tactile layer, which may provide the user with a tactile reaction.

The (digital) pen sensor 254 may include, for example, a recognition sheet which is a part of the touch panel or is separated from the touch panel. The key 256 may include, for example, a physical button, an optical key, or a keypad.

The ultrasonic input device 258 may detect ultrasonic waves generated by an input tool through the microphone 288, and may confirm data corresponding to the detected ultrasonic waves.

The (digital) pen sensor 254 may be implemented, for example, by using the same or similar method of receiving a touch input of the user or by using an additional sheet for recognition.

The key 256 may be, for example, a physical button, an optical key, a keypad, and/or a touch key.

The ultrasonic input unit 258 may be a device by which the electronic device 201 detects a reflected sound wave through a microphone 288 and is capable of radio recognition. For example, an ultrasonic signal, which may be generated by using a pen, may be reflected off of an object and detected by the microphone 288.

The electronic device 201 may use the communication module 220 to receive a user input from an external device (e.g., a computer or a server) connected thereto.

The display 260 may include a panel 262, a hologram 264, and/or a projector 266.

The panel 262 may be, for example, a liquid-crystal display (LCD), an active-matrix organic light-emitting diode (AM-OLED), and/or the like. The panel 262 may be implemented, for example, in a flexible, transparent, or wearable manner. The panel 262 may be constructed as one module with the touch panel 252.

The hologram device 264 may use an interference of light and may display a stereoscopic image in the air.

The projector 266 may display an image by projecting a light beam onto a screen. The screen may be located inside or outside the electronic device 201.

The display 260 may further include a control circuit for controlling the panel 262, the hologram device 264, or the projector 266.

The interface 270 may include, for example, an HDMI 272, a USB 274, an optical communication interface 276, and/or a D-subminiature (D-sub) 278. The interface 270 may be included, for example, in the communication interface 160 of FIG. 1. Additionally or alternatively, the interface 270 may include, for example, mobile high-definition link (MHL), SD/multi-media card (MMC) and/or infrared data association (IrDA).

The audio module 280 may bilaterally convert a sound and an electric signal. At least some elements of the audio module 280 may be included in the input/output interface 150 of FIG. 1. The audio module 280 may convert sound information which is input or output through a speaker 282, a receiver 284, an earphone 286, the microphone 288, and/or the like.

The speaker 282 may output a signal of an audible frequency band and a signal of an ultrasonic frequency band. Reflected waves of an ultrasonic signal emitted from the speaker 282 may be received, or a signal of an external audible frequency band may also be received.

The camera module 291 may be a device for image and/or video capturing, and may include one or more image sensors (e.g., a front sensor or a rear sensor), a lens, an image signal processor (ISP), and/or a flash (e.g., an LED or a xenon lamp). In certain instances, it may prove advantageous to include two or more camera module.

The power management module 295 manages power of the electronic device 201. The power management module 295 may include a power management integrated circuit (PMIC), a charger IC, or a battery gauge.

The PMIC may be placed inside an IC or SoC semiconductor. Charging is classified into wired charging and wireless charging. The charger IC may charge a battery and may prevent an over-voltage or over-current flow from a charger. The charger IC may include a charger IC for at least one of the wired charging and the wireless charging.

The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge may measure, for example, a residual quantity of the battery 296 and a voltage, current, and/or temperature during charging. The battery 296 stores or generates electricity and supplies power to the electronic device 201 by using the stored or generated electricity. The battery 296 may include a rechargeable battery or a solar battery.

The indicator 297 may indicate a specific state, for example, a booting state, a message state, a charging state, and/or the like, of the electronic device 201 or a part thereof (e.g., the AP 210).

The motor 298 may convert an electric signal into a mechanical vibration.

The electronic device 201 may include a processing unit (e.g., a GPU) for supporting mobile TV. The processing unit for supporting mobile TV processes media data according to a protocol of, for example, digital multimedia broadcasting (DMB), digital video broadcasting (DVB), media flow, and/or the like.

Each of the aforementioned elements of the electronic device 201 may consist of one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

At least some parts of a device (e.g., modules or functions thereof) or method (e.g., operations) may be implemented with an instruction stored in a computer-readable storage media for example. The instruction may be executed by the processor 210, to perform a function corresponding to the instruction. The computer-readable storage media may be, for example, the memory 230. At least some parts of the programming module may be implemented (e.g., executed), for example, by the processor 210. At least some parts of the programming module may include modules, programs, routines, a set of instructions, processes, and the like, for performing one or more functions.

Figure 3:
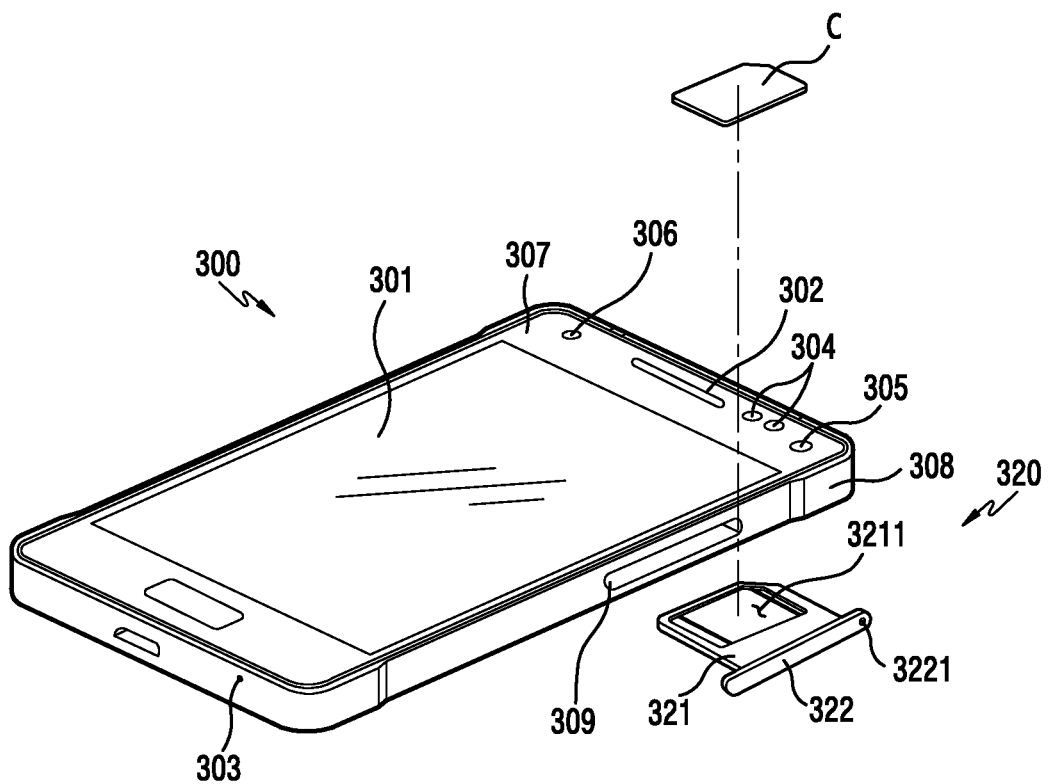
FIG. 3 illustrates a perspective view of a state of applying a tray to an electronic device according to various embodiments of the present disclosure.

FIG. 3 is a perspective view illustrating a state of applying a tray 320 to an electronic device 300 according to various embodiments of the present disclosure.

Referring to FIG. 3, a display 301 may be installed to one surface 307 of the electronic device 300. A speaker device 302 for receiving voice of a peer user may be installed to an upper side of the display 301. A microphone device 303 for transmitting voice of a user of the electronic device may be installed to a lower side of the display 301.

According to various embodiments, components for performing various functions of the electronic device 300 may be disposed around a portion in which the speaker device 302 is installed. The components may include at least one sensor module 304. The sensor module 304 may include, for example, at least one of an illumination sensor (e.g., an optical sensor), a proximity sensor, an infrared sensor, and an ultrasonic sensor. According to one exemplary embodiment, the component may include a camera device 305. According to one exemplary embodiment, the component may include a Light Emitting Diode (LED) indicator 306 for allowing the user to recognize state information of the electronic device 300.

According to various embodiments, the electronic device may include a side surface 308 extended from the surface 307 and capable of at least partially contributing to a thickness of the electronic device 300. According to one embodiment, an opening 309 having a specific length may be formed to the side surface 308. According to one exemplary embodiment, the opening 309 is for containing the tray 320, and may include a hole having a specific length and extended to an inner portion of the electronic device 300 to contain the tray 320. According to one embodiment, the hole may be formed with a length at least corresponding to a length of the tray.

According to various embodiments, the tray 320 may include a tray body 321 to be inserted to the opening 309, and a tray cover 322 disposed to an end portion of the tray body 321. According to an embodiment, the tray body 321 may include at least one external component container 3211 for containing at least one external component. According to an embodiment, a pin inserting hole 3221 may be formed to the tray cover 322 so that a tray unloading pin can penetrate at least partially into the electronic device. According to an embodiment, the tray body 321 and the tray cover 322 may be integrally formed, or may be configured in combination of different members. According to an embodiment, the tray 320 may be formed of a metal material. However, without being limited thereto, the tray may also be formed of a synthetic resin material, a composite material, or the like. According to an embodiment, when the tray body and the tray cover are separately formed to be assembled with each other, different members may be applied.

According to various embodiments, the tray cover 322 is a portion exposed to the outside of the electronic device 300 when the tray 320 is placed to the electronic device 300, and may be disposed to be aligned or misaligned with an outer surface of the electronic device 300.

According to various embodiments, an external component C may be placed to the external component container 3211 of the tray body 321. According to an embodiment, the external component C may be a card-type external device. According to an embodiment, the card-type external device may be a memory card. According to an embodiment, the card-type external device may be a subscriber identification module (e.g., SIM, UIM) card.

According to various embodiments, when the tray body 321 to which the external component C is placed is completely placed to the opening 309 of the electronic device 300, in an inner portion of the electronic device 300, the external component C may be electrically connected to the electronic device 300. According to an embodiment, the external component C may be electrically connected in such a manner that exposed at least one terminal is in contact with at least one connector disposed on a substrate of the electronic device 300. According to an embodiment, since the tray body 321 is inserted to a tray socket disposed inside the electronic device 300, the electrical connection may be achieved in such a manner that the exposed at least one terminal is in contact with at least one connector included in the socket disposed on the substrate of the electronic device 300.

According to various embodiments, the tray 320 may have a fixing structure in which a position thereof is fixed when it is completely inserted to the opening 309 of the electronic device 300. According to an embodiment, the tray 320 may include an unloading structure capable of unloading the tray 320 only with an operation in which the tray unloading pin is pressed by being inserted to the pin inserting hole 3221 of the tray cover 322. According to various embodiments of the present disclosure, since the fixing structure for fixing the tray 300 and the unloading structure for unloading the tray 320 are implemented together, a space of placing the tray device can be minimized in the electronic device, thereby contributing to make the electronic device slim.

Hereinafter, the tray device will be described in detail.

Figure 4A:
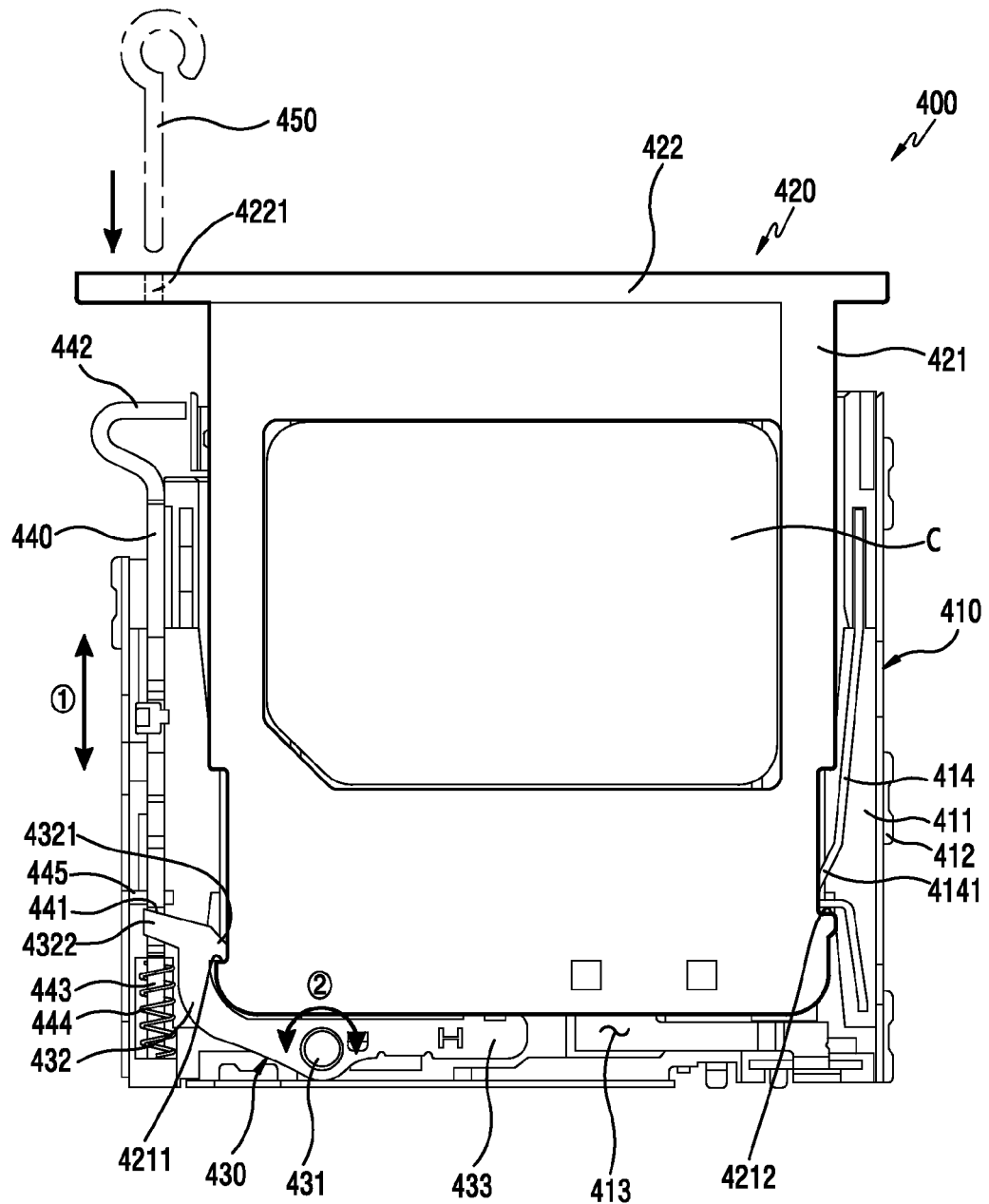
FIG. 4A illustrates a structure of a tray device according to various exemplary embodiments of the present disclosure.
Figure 4B:
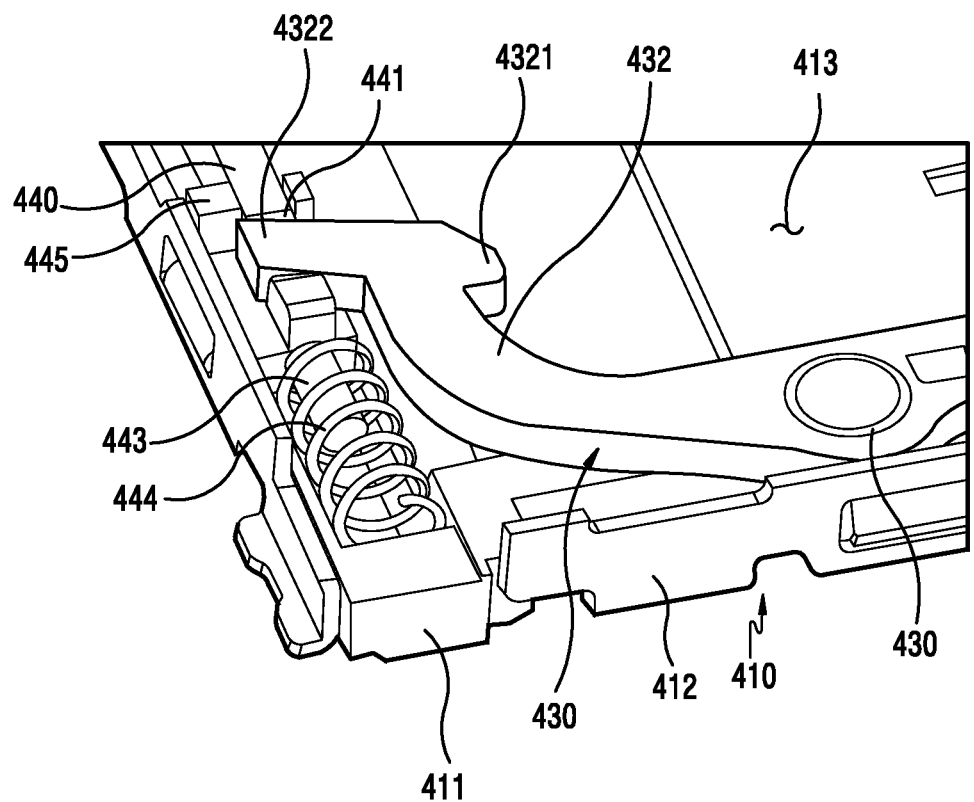
FIG. 4B illustrates a perspective view of a relation of coupling a rotation lever and a pressing lever to fix or unload a tray according to various embodiments of the present disclosure.
Figure 4C:
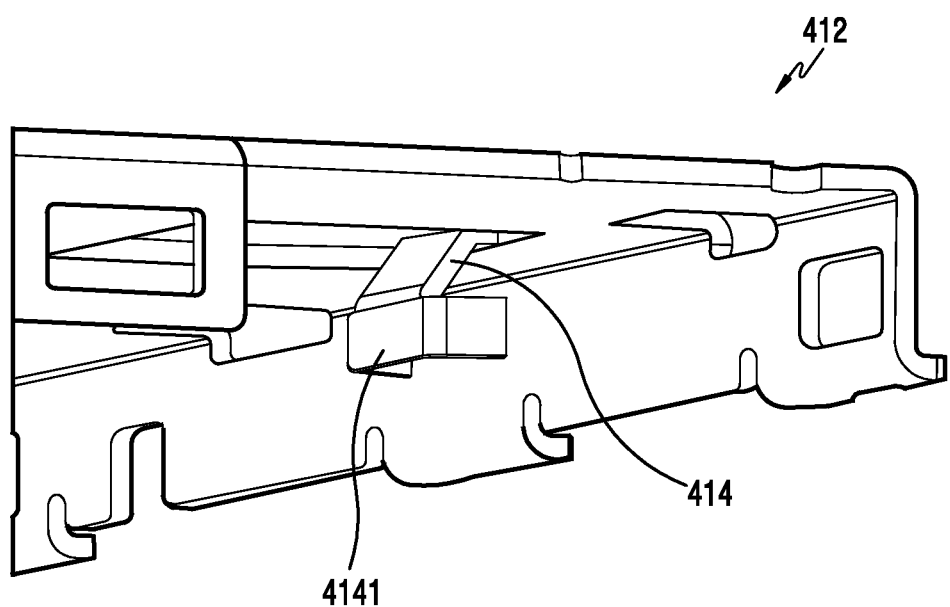
FIG. 4C illustrates a perspective view of a structure including an elastic piece for supporting one portion of a tray according to various embodiments of the present disclosure.

FIG. 4A illustrates a structure of a tray device according to various embodiments of the present disclosure. FIG. 4B is a perspective view illustrating a relation of coupling a rotation lever and a pressing lever to fix or unload a tray according to various embodiments. FIG. 4C is a perspective illustrating a structure of an elastic piece for supporting one portion of a tray according to various exemplary embodiments of the present disclosure.

A tray 420 of FIG. 4A to FIG. 4C may be an embodiment of a tray similar to or different from the tray 320 of FIG. 3.

Referring to FIG. 4A and FIG. 4B, a tray device 400 may include a tray socket 410 disposed inside an electronic device, the tray 420 selectively inserted to the tray socket 410, a rotation lever 430 for fixing the tray 420 to an inner portion of the electronic device or for unloading the fixed tray, and a pressing lever 440 for inducing a rotation of the rotation lever 430.

According to various embodiments, the tray socket 410 may be disposed inside the electronic device. According to an embodiment, the tray socket 410 may be mounted on a substrate disposed inside the electronic device. However, without being limited thereto, various positions corresponding to the aforementioned opening formed to the electronic device are also possible. According to an embodiment, the tray socket 410 may be formed by mutually coupling an injection portion 411 formed of a synthetic resin material and a metal member 412. However, without being limited thereto, the tray socket 410 may also be formed of a single material. According to an embodiment, the tray socket 410 may include a tray containing space 413 for containing a tray body 421 of the tray 420 which enters through an opening formed to the electronic device. According to an embodiment, the tray containing space 413 may include at least one connector to be electrically in contact with exposed as least one terminal of the external component C placed to the tray body 421.

According to various embodiments, the tray 420 may include the tray body 421 placed to a tray inserting opening of the electronic device and a tray cover 422 disposed to an end portion of the tray body 421. According to an embodiment, the tray body 421 may contain at least one external component C. According to an embodiment, a first engaging groove 4211 may be formed on one side of the tray body 421, and a second engaging groove 4212 may be formed on the other side. According to an embodiment, when the tray 420 is placed to the tray socket 410, the first engaging groove 4211 may be formed in a shape capable of being engaged by a lever engaging portion 4321 of the rotation lever 430 to be described below. According to an embodiment, when the tray 420 is placed to the tray socket 410, the second engaging groove 4212 may be formed in a structure capable of engaging an engaging portion 4141 of an elastic piece 414 disposed inside the tray containing space 413 of the tray socket 410.

According to various embodiments, a pin inserting hole 4221 which penetrates the tray cover 422 may be formed on one side of the tray cover 422. According to an embodiment, the pin inserting hole 4221 may contain a tray unloading pin 450 for unloading the tray 420 fixed to the tray socket 410. According to an embodiment, the tray unloading pin 450 may press a pin contact portion 442 of the pressing lever 440 to be described below in a tray inserting direction by penetrating the pin inserting hole 4221 of the tray cover 422.

According to exemplary embodiments, the rotation lever 430 may be installed inside the tray socket 410 in a rotatable manner. According to an embodiment, the rotation lever 430 may include a first end portion 432 which fixes one side of the tray 420 when the tray 420 is placed to the tray socket 410 and which releases the fixed portion when the tray 420 is unloaded, and a second end portion 433 which presses the tray 420 placed to the tray socket 410 in an unloading direction when the first end portion 432 rotates about a rotation axis 431.

According to various embodiments, the first end portion 432 may include the lever engaging portion 4321 extended in a tray socket direction and engaged by the first engaging groove 4211 of the placed tray 420 to restrain detachment of the tray 420. According to an embodiment, the first end portion 432 may include a stopper portion 4322 formed in an opposite direction of the lever engaging portion 4321 so as to be restrained by the pressing lever 440. According to an embodiment, the first end portion 432 and the second end portion 433 may be formed integrally about the rotation axis 431. According to an embodiment, the lever engaging portion 4321 and stopper portion 4322 of the first end portion 432 may also be formed integrally. According to an embodiment, the rotation lever 430 may be formed through an injection of a composite resin material. According to an embodiment, the rotation lever 430 may be formed of a metal material.

According to various embodiments, the pressing lever 440 may be formed to have a length in a direction of placing the tray 420 and thus may be disposed to one side of the tray socket 410. According to an embodiment, as illustrated, the pressing lever 440 may be disposed in a moveable manner in a direction of attaching/detaching the tray 420 (i.e., a direction ① of FIG. 4A). According to an embodiment, the pressing lever 440 may have a stopper groove 441 for mounting the stopper portion 4322 formed on the first end portion 432 of the rotation lever 430. Therefore, when the pressing lever 440 moves in a tray placing direction, the first end portion 432 of the rotation lever 430 may rotate about the rotation axis 431 in the tray placing direction (e.g., a counterclockwise direction of a direction ② of FIG. 4A), and the second end portion 433 may also rotate in a tray unloading direction (e.g., a counterclockwise direction of the direction ② of FIG. 4A) due to a rotation of the first end portion 432.

According to various embodiments, the pressing lever 440 may be installed such that the tray 420 is always pressed in a direction of being unloaded from the tray socket 410 by an elastic member 444 disposed to one end. According to an embodiment, the elastic member 444 may include a spring. According to an embodiment, the spring may include a compressed coil spring. According to an embodiment, when the spring is used as the elastic member 444, the spring may be installed in such a manner that a shaft 443 extended from one end of the pressing lever 440 penetrates. According to an embodiment, a restoring force of the pressing lever 440 depending on the elastic member 444 may provide a restraining force so that the lever engaging portion 4321 formed on the first end portion 432 of the rotation lever 430 is not randomly detached from the first engaging groove 4211 of the tray body 421. According to an embodiment, the other end of the pressing lever 440 may include the pin contact portion 442. According to an embodiment, the pin contact portion 442 may be formed in such a shape that an end portion of a tray unloading pin which penetrates the pin inserting hole 4221 of the tray cover 422 can be smoothly in contact.

According to various embodiments, both of the rotation lever 430 and the pressing lever 440 may be formed in a space other than a space of placing the tray inside the tray socket. However, without being limited thereto, at least one portion of the rotation lever 430 and the pressing lever 440 may also be disposed inside a housing of the electronic device in the outside of the tray socket.

Referring to FIG. 4C, when the tray 420 is placed to the tray socket 410, the engaging portion 4141 of the elastic piece 414 may fix the tray in a manner of being engaged by the second engaging groove 4212 of the tray body 421. According to an embodiment, when at least one portion of the tray socket 410 is formed of a metal material, the elastic piece 414 may be formed integrally. According to an embodiment, the elastic piece 414 may be extended in a direction of a tray containing space in the metal member 412, and an end portion may include the engaging portion 4141 formed in a shape of being engaged by the second engaging groove 4212 of the tray to be placed.

Figure 5:
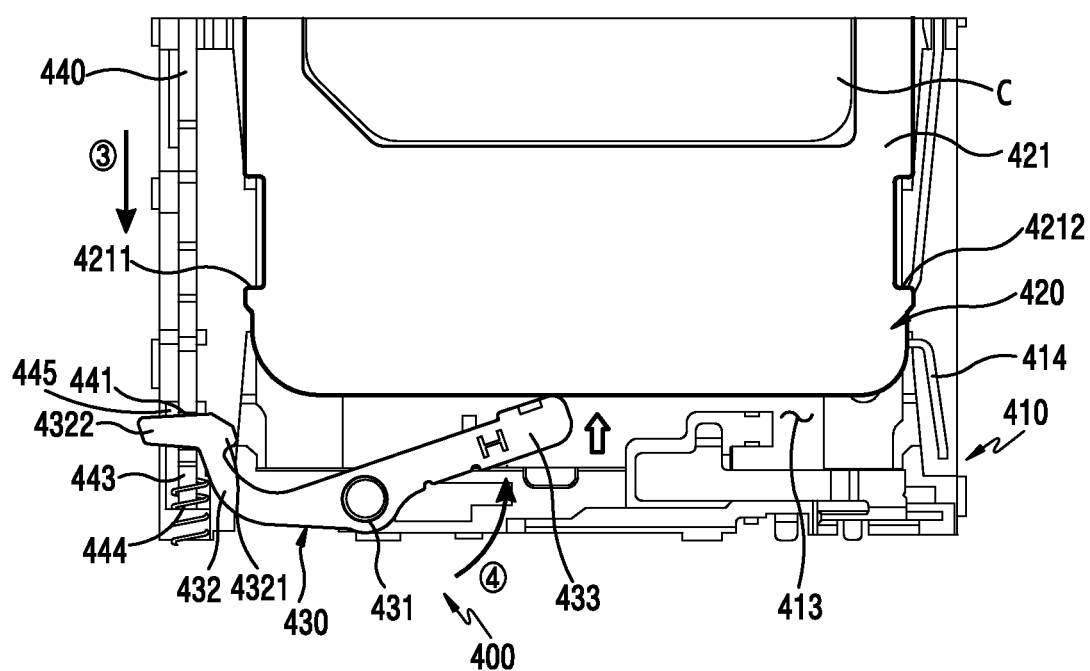
FIG. 5 illustrates an operational view of a state of unloading a tray using a rotation lever and a pressing lever according to various embodiments of the present disclosure.

FIG. 5 is an operational view illustrating a state of unloading the tray 420 by the rotation lever 430 and the pressing lever 440 according to various exemplary embodiments of the present disclosure.

Referring to FIG. 5, as shown in FIG. 4A, after penetrating the tray unloading pin through the pin inserting hole of the tray cover in a state where the tray 420 is completely placed to the tray socket 410, the pin contact portion of the pressing lever 440 may be pressed in a direction ③ of FIG. 5 with a specific pressing force. According to an embodiment, the pressing lever 440 moves downwardly while having elasticity caused by the elastic member 444, and thus the first end portion 432 of the rotation lever 430 restrained by the stopper groove 441 of the pressing lever 440 may also move in a counterclockwise direction about the rotation axis 431 by drawing an arc. At the same time, the restraint imposed on the lever engaging portion 4321 of the first end portion 432 may be released by being detached from the first engaging groove 4211 of the tray cover 421. According to an embodiment, the second end portion 433 of the rotation lever 430 may also rotate in a direction ④ of FIG. 5 (i.e., a counterclockwise direction about a rotation axis) due to a rotation of the first end portion 432. In this case, the second end portion 433 presses the tray 420 in an unloading direction, and thus the tray 420 may be unloaded to the outside of the electronic device.

According to various embodiments, after the tray 420 and the tray unloading pin are removed, the pressing lever 440 may be restored to an original position due to a restoring force of the elastic member 444. According to various embodiments, the tray 420 may further include a lever stopper piece 445. When the lever 440 rotates in a clockwise direction due to the restoring force of the elastic member 444, the lever stopper piece 445 may restrain a clockwise rotation of the lever so that the lever engaging portion 4321 does not enter into a virtual tray region. Therefore, the rotation lever 430 may maintain the same state of FIG. 4A.

According to various embodiments, the tray 420 may be placed to the electronic device. According to an embodiment, when the tray 420 is placed to the tray socket 410, the first end portion 432 of the rotation lever 430 may be slightly recessed in a backward direction due to a portion in which the first engaging groove 4211 of the tray body 421 starts, and the lever engaging portion 4321 of the first end portion 432 may be engaged in a manner of being mounted on the first engaging groove 4211 of the tray body 421 due to a persistent placement operation of the tray 420. In this case, a force for persistently rotating about the rotation axis 431 is offered to the rotation lever 430 due to a pressing force of the pressing lever 440 pressed by the elastic member 444. Due to the rotation force, the lever engaging portion 4321 of the first end portion 432 may not be detached from the first engaging groove 4211. According to an embodiment, at the same time, the engaging portion 414 of the elastic piece 414 provided by the tray socket 410 is also engaged to the second engaging groove 4212 of the tray body 421, thereby fixing both side surfaces of the tray 420.

Figure 6A:
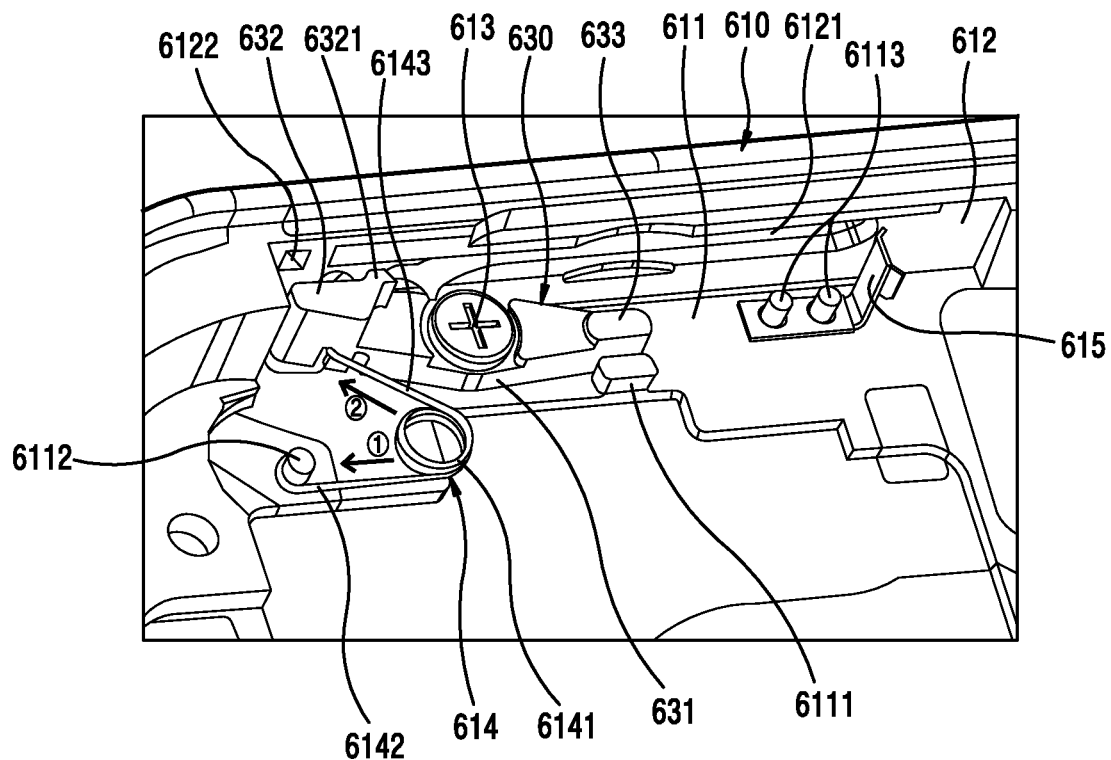
FIG. 6A illustrates a structure in a state of installing a rotation lever for fixing and unloading a tray according to various embodiments of the present disclosure.
Figure 6B:
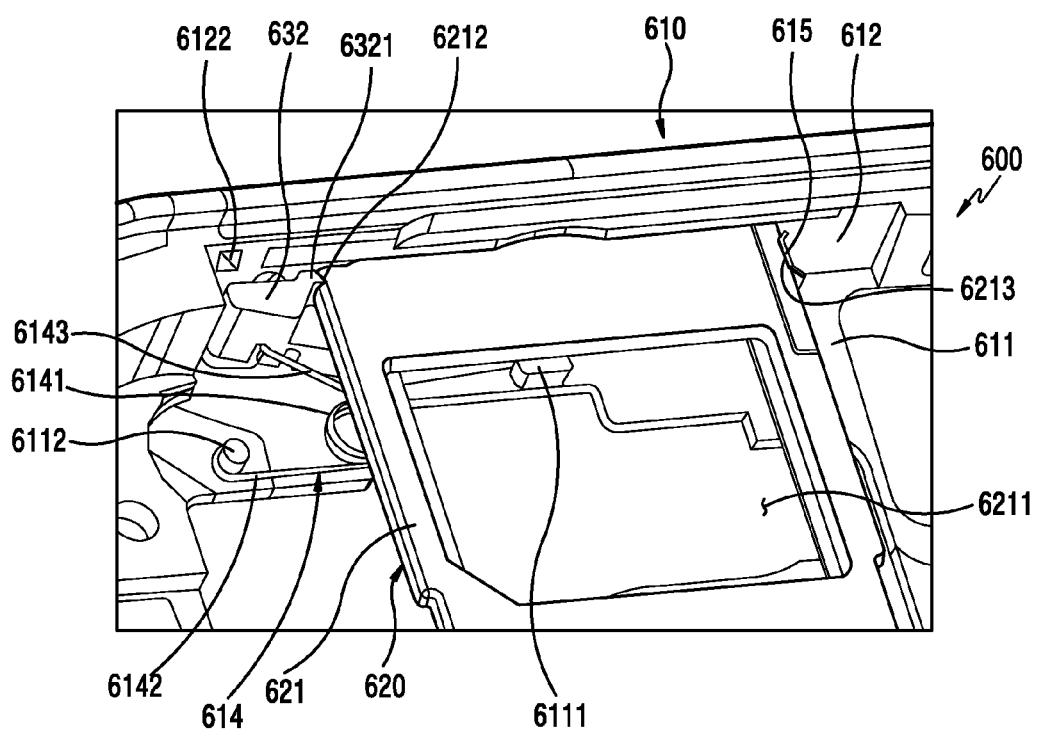
FIG. 6B illustrates is a perspective view of a structure of a tray device according to various embodiments of the present disclosure.

FIG. 6A illustrates a structure of installing a rotation lever 630 for fixing and unloading a tray according to various embodiments of the present disclosure. FIG. 6B is a perspective view illustrating a structure of a tray device 600 according to various embodiments of the present disclosure.

A tray 620 of FIG. 6B may be an embodiment of a tray similar to or different from the trays 320 and 420 of FIG. 4 and FIG. 4A.

Referring to FIG. 6A and FIG. 6B, the tray device 600 may include the rotation lever 630 disposed inside the electronic device in a rotatable manner, the tray 620 placed through a tray inserting opening 6121, the rotation lever 630 for fixing the tray 620 to an inner portion of the electronic device or for unloading the fixed tray 620, and an elastic member 614 for supplying a persistent rotation force in one direction to the rotation lever 630. According to an embodiment, although not shown, a tray socket may be further included inside the electronic device to at least partially contain the tray 620 and to electrically connect an external component placed to the tray 620 to the electronic device. According to an embodiment, only at least one connector for being electrically in contact with exposed at least one terminal of the external component placed to the tray 620 may be included in a tray containing space in the tray socket.

According to various embodiments, the rotation lever 630 for fixing or unloading the tray 620 placed through the tray inserting opening 6121 may be disposed to an inner lower surface 611 of a housing 610 of the electronic device instead of the tray socket. Accordingly, the rotation lever 630 may be disposed in a rotatable manner to the lower surface 611 of the housing 610 around the tray inserting opening 6121 disposed to a side surface 612 of the housing 610. According to an embodiment, the rotation lever 630 may be installed such that a rotation axis 631 is rotatable by a screw 613.

According to various embodiments, the rotation lever 630 may include a first end portion 632 extended up to the side surface 612 of the tray 620 inserted through the tray inserting opening 6121 to fix one side of the tray 620 when placed to the lower surface 611 of the housing 610, and a second end portion 633 for pressing the tray 620 placed to the tray socket in an unloading direction due to a rotation of the first end portion 632 about the rotation axis 631. According to an embodiment, the second end portion 633 and/or the rotation axis 631 may be disposed to overlap with the tray 620 to be placed, and at least one portion of the first end portion 632 may be extended to the outside of the tray to be placed.

According to various embodiments, the first end portion 632 may include a lever engaging portion 6321 extended in a side surface direction of the placed tray 620. According to an embodiment, the lever engaging portion 6321 may be engaged to a first engaging groove 6212 formed on one side of the placed tray 620 to restrain detachment of the tray 620. According to an embodiment, a first surface of the first end portion 632 may be formed in a shape associated with a pin inserting hole 6122 formed to the housing 610, and a second surface associated with the first surface of the first end portion 632 may be formed in a shape capable of being supported by a pressing portion 6143 of the elastic member 614.

According to various embodiments, an engaging piece 615 fixed to the lower surface 611 of the housing 610 may be included. According to an embodiment, the engaging piece 615 may be finally fixed by bonding in a state of being temporarily assembled to a bonding pole 6113 disposed to the housing 610. However, without being limited thereto, when the engaging piece 615 is formed of a metal material, it may be fixed to the housing 610 formed of a synthetic resin material in an insert-molding manner. According to an embodiment, the engaging piece 615 may also be fixed to the housing 610 by screw fastening. According to an embodiment, the engaging piece 615 may be formed in a shape capable of being engaged to a second engaging groove 6213 formed on the other side of the tray 620 placed through the tray inserting opening 6121. Accordingly, the tray 620 placed through the tray inserting opening 6121 may be fixed to the inside of the electronic device by an operation in which the lever engaging portion 6321 formed on the first end portion 632 of the rotation lever 630 is engaged to the first engaging groove 6212 of the tray 620 while the engaging piece 615 is engaged to the second engaging groove 6213 of the tray 620.

According to various embodiments, the elastic member 614 may be disposed to the lower surface 611 of the housing 610. According to an embodiment, the elastic member 614 may include a torsion spring. According to an embodiment, the elastic member 614 may include a supporting portion 6142 extended in a first direction (i.e., a direction ① of FIG. 6A) about a center 6141, and the pressing portion 6143 extended in a second direction (e.g., a direction ② of FIG. 6A) about the center 6414 to press a second surface of the first end portion 632 of the rotation lever 630. According to an embodiment, the first end portion 632 of the rotation lever 630 may be pressed to rotate by drawing an arc in a direction of the pin inserting hole 6122 of the housing 610 by the pressing portion 6143 of the elastic member 614, and thus the second end portion 633 of the rotation lever 630 may be pressed to rotate by drawing an arc in an opposite direction of the tray inserting opening 6121 of the housing 610. According to an embodiment, a support protrusion 6111 for restraining a rotation range of the second end portion 633 may be formed on the lower surface 611 of the housing 610 in a protrusion manner.

Figure 6C:
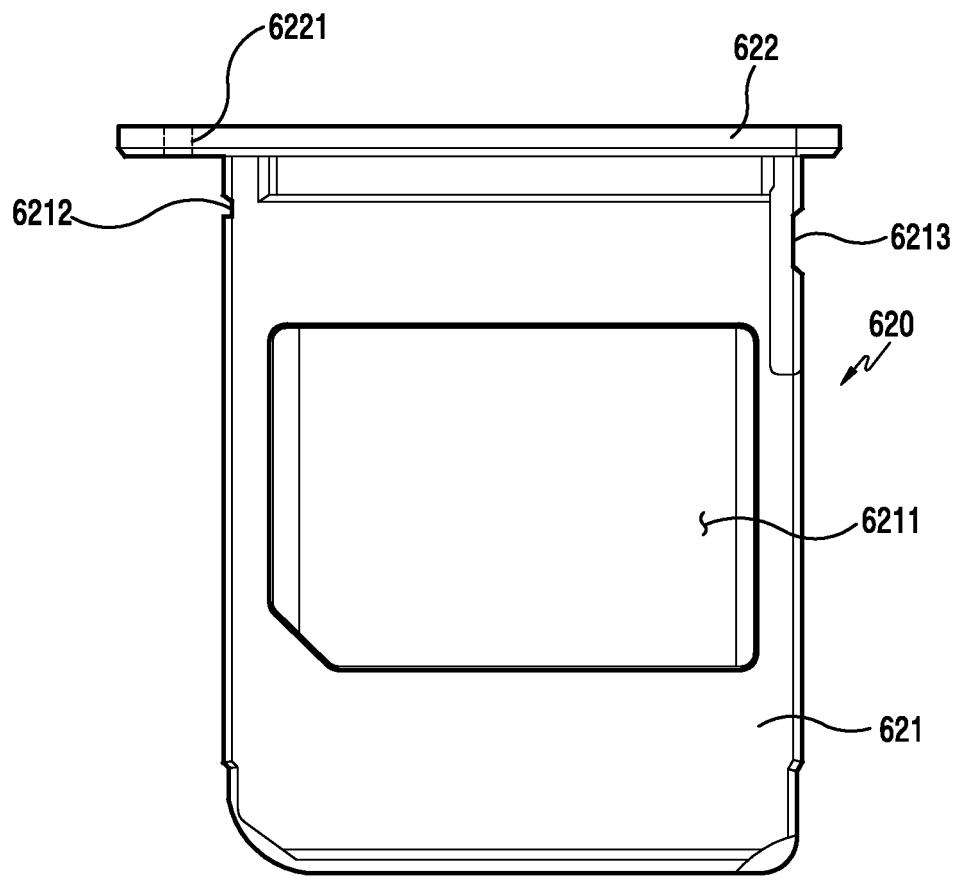
FIG. 6C and FIG. 6D illustrate a front surface and a rear surface of a tray according to various embodiments of the present disclosure.
Figure 6D:
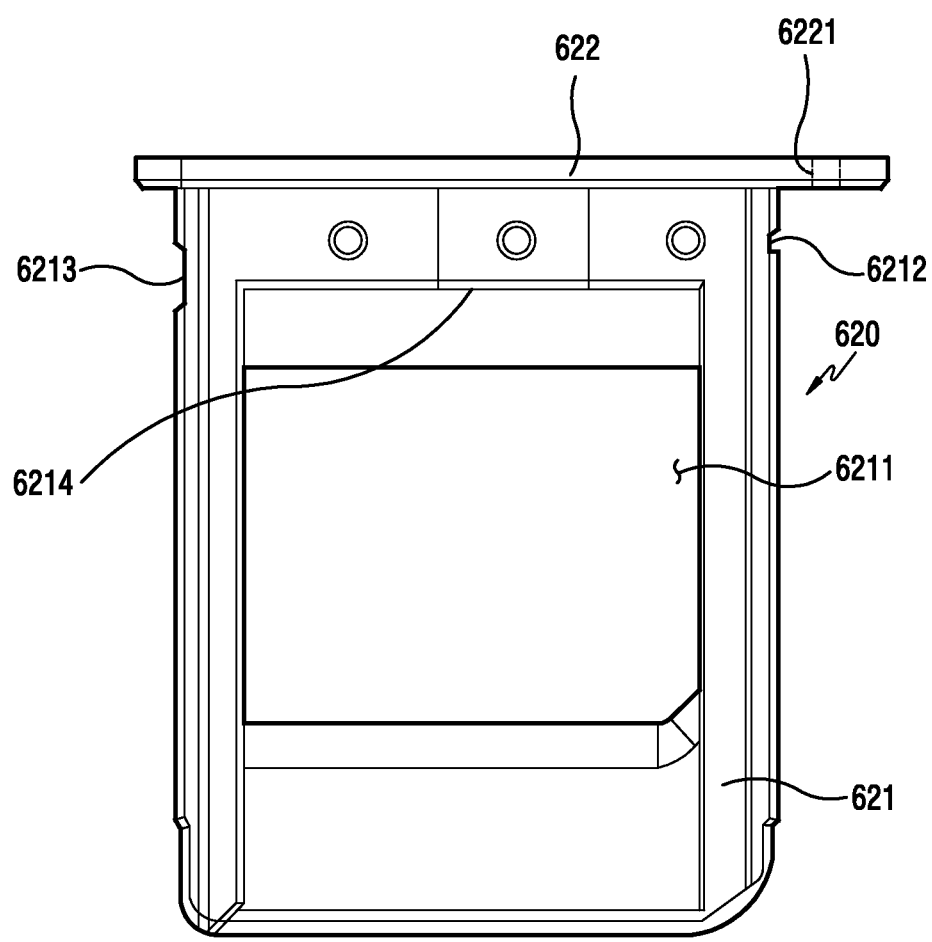

FIG. 6C and FIG. 6D illustrate a front surface and a rear surface of the tray 620 according to various embodiments of the present disclosure.

Referring to FIG. 6B to FIG. 6D, the tray 620 may include a tray body 621 placed to a tray inserting opening formed to a side surface of the housing of the electronic device, and a tray cover 622 disposed to an end portion of the tray body 621. According to an embodiment, the tray body 621 may include an external component container 6211 for containing at least one external component. According to an embodiment, the first engaging groove 6212 may be formed on one side of the tray body 621, and the second engaging groove 6213 may be formed on the other side. According to an embodiment, when the tray 620 is placed inside the housing 610, the first engaging groove 6212 may be formed in a shape capable of being engaged to the lever engaging portion 6321 formed on the first end portion 632 of the rotation lever 630. According to an embodiment, when the tray 620 is placed inside the housing, the second engaging groove 6213 may be formed in a structure capable of being engaged to the engaging piece 615 installed to the lower surface of the housing 610.

According to various embodiments, a pin inserting hole 6221 which penetrates the tray cover 622 may be formed on one side of the tray cover 622. According to an embodiment, the pin inserting hole 6221 may contain a tray unloading pin for unloading the tray 620 fixed inside the housing 610 of the electronic device. According to an embodiment, the tray unloading pin may penetrate the pin inserting hole 6221 of the tray cover 621 to press the first end portion 632 of the rotation lever 630 in a tray placing direction.

According to various embodiments, an engaging recess 6214 may be formed on a rear surface (i.e., a surface facing the rotation lever) of the tray body 621. According to an embodiment, when the first end portion 632 of the rotation lever 630 is pressed by the tray unloading pin to unload the tray 620 placed on the electronic device, the engaging recess 6214 may be formed to have a height difference so that the second end portion 633 is engaged to push the tray 620 in an unloading direction.

Figure 7A:
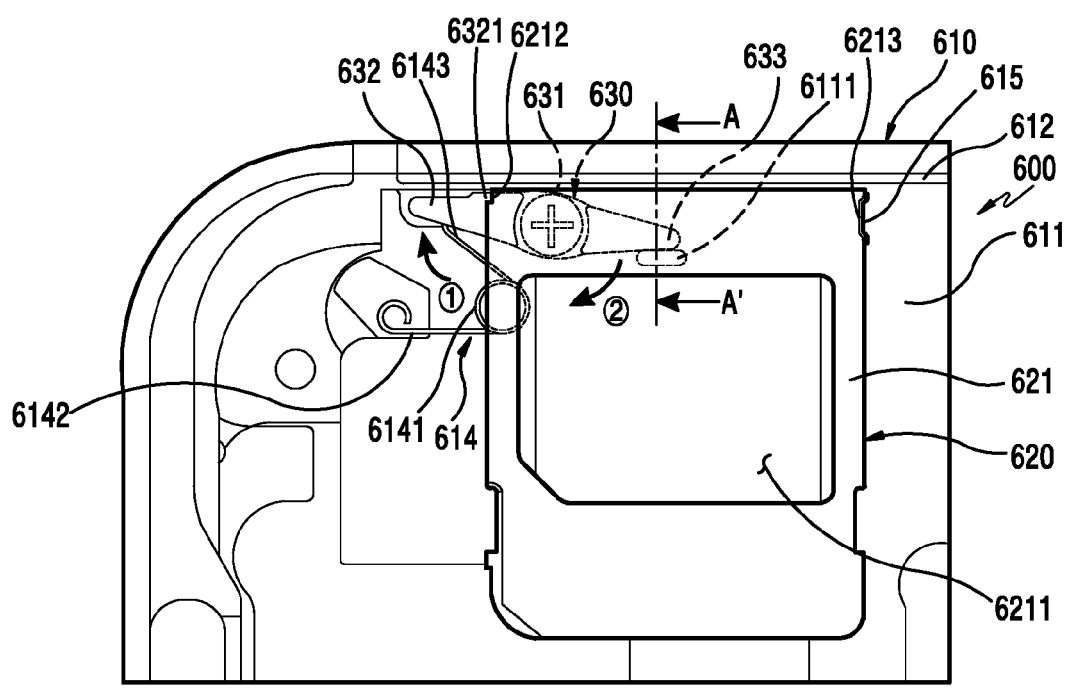
FIG. 7A and FIG. 7B illustrate a state in which a tray is fixed after being placed to an electronic device according to various exemplary embodiments of the present disclosure.
Figure 7B:
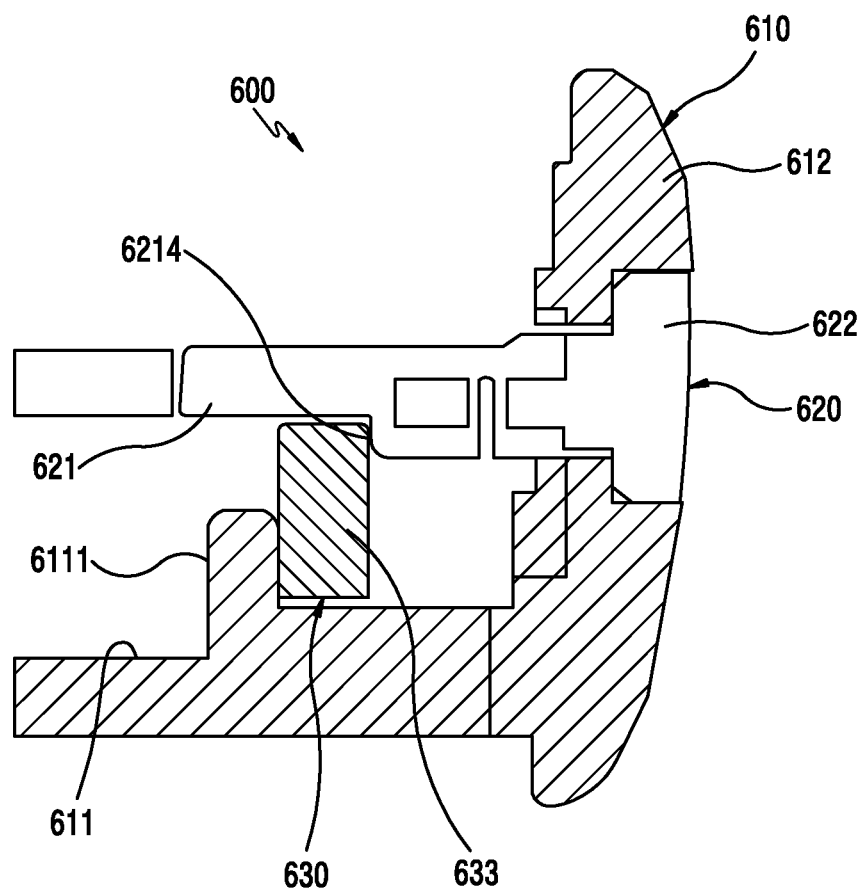

FIG. 7A and FIG. 7B illustrate a state in which the tray 620 is fixed after being placed to an electronic device according to various exemplary embodiments of the present disclosure. According to an embodiment, FIG. 7B is a cross-sectional view cut along the line A-A' of FIG. 7A.

Referring to FIG. 7A and FIG. 7B, when the tray 620 is completely placed inside the housing 610, the first end portion 632 of the rotation lever 630 may be slightly recessed in a backward direction due to a portion in which the first engaging groove 6212 of the tray body 621 starts, and the lever engaging portion 6321 of the first end portion 632 may be engaged in a manner of mounting to the first engaging groove 6212 of the tray body 621 due to a persistent placement operation of the tray 620. In this case, a pressing force is provided to the rotation lever 630 about the rotation axis 631 in a clockwise direction (i.e., a direction ① of FIG. 7A) due to the pressing force of the elastic member 614, and the lever engaging portion 6321 of the first end portion 632 may not be detached from the first engaging groove 6212 of the tray body 621 due to this rotation force. According to an embodiment, at the same time, the second engaging groove 6213 of the tray body 621 may also be engaged to the engaging piece 615 provided to the lower surface of the housing 610, thereby fixing both side surfaces of the tray 620. According to an embodiment, although the second end portion 633 of the rotation lever 630 is to rotate in a clockwise direction (i.e., a direction ② of FIG. 7A) due to the pressing force of the elastic member 614, a rotation range thereof may be restrained due to the support protrusion 6111 formed on the lower surface 611 of the housing 610. This may be advantageous to restrain the rotation range of the rotation lever 630 which is to persistently rotate in a state where the tray 620 is not placed.

Figure 8A:
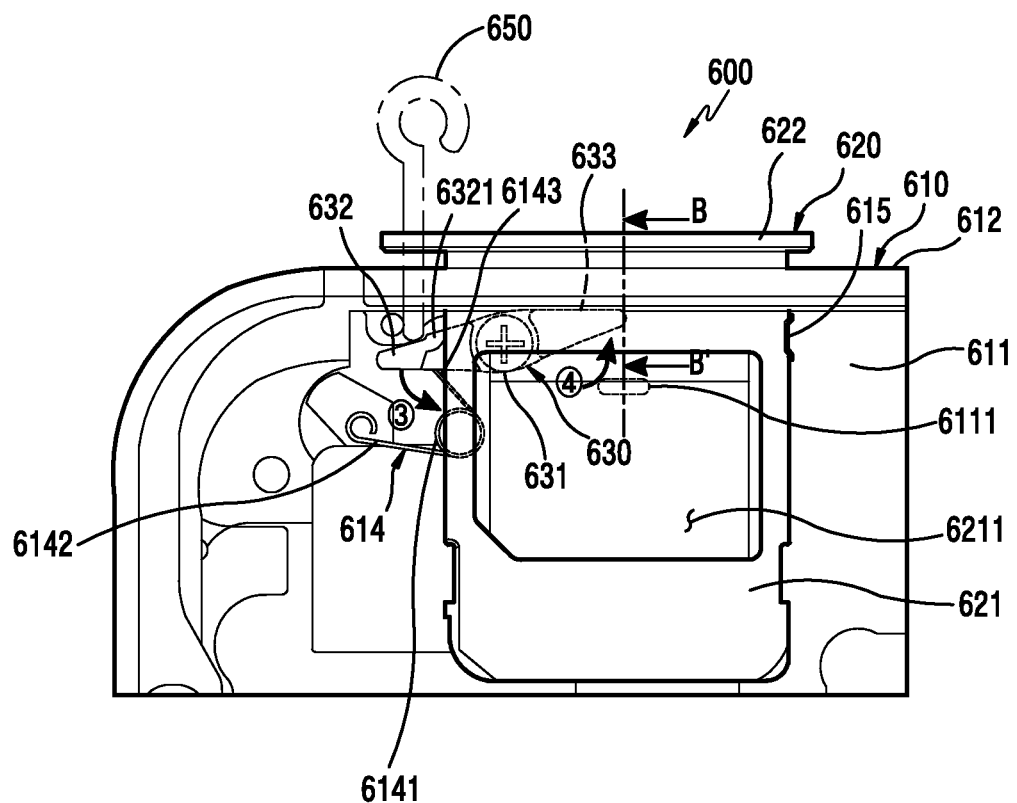
FIG. 8A and FIG. 8B illustrate operational views of a state in which a tray is unloaded in an electronic device according to various exemplary embodiments of the present disclosure.
Figure 8B:
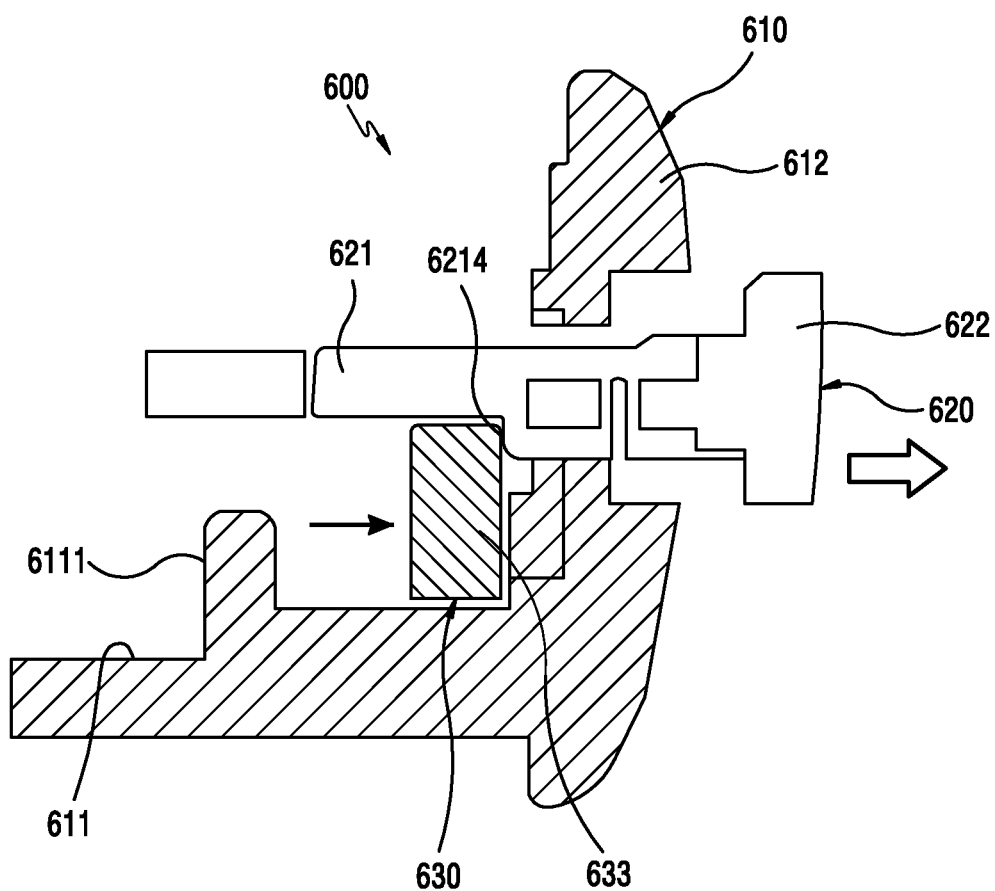

FIG. 8A and FIG. 8B are operational views illustrating a state in which the tray 620 is unloaded in an electronic device according to various embodiments of the present disclosure. According to one exemplary embodiment, FIG. 8B is a cross-sectional view cut along the line B-B' of FIG. 8A.

Referring to FIG. 8A and FIG. 8B, the tray unloading pin 650 may be allowed to penetrate through a pin inserting hole of the tray cover 622 in a state where the tray 620 is completely placed to the housing 610, and thereafter the first end portion 632 of the rotation lever 630 may be pressed in a counterclockwise direction (i.e., a direction ③ of FIG. 8A) with a specific pressuring force. According to an embodiment, the pressed rotation lever 630 rotates by drawing an arc in a counterclockwise direction while having elasticity caused by the elastic member 614, and at the same time, the restraint imposed on the lever engaging portion 6321 of the first end portion 632 may be released by being detached from the first engaging groove 6212 of the tray body 621. According to an embodiment, the second end portion 633 of the rotation lever 630 may also rotate by drawing an arc in a counterclockwise direction (i.e., a direction ④ of FIG. 8A) due to a rotation of the first end portion 632. In this case, the second end portion 633 presses the engaging recess 6214 formed on the tray bock in a tray unloading direction, and thus the tray 620 may be unloaded to the outside of the electronic device.

According to various embodiments, when the tray 620 and the tray unloading pin 650 are removed, the rotation lever 630 may be restored to an original position due to a restoring force of the elastic member 614, and the second end portion 633 of the rotation lever 630 may be restrained by the support protrusion 6111 formed on the housing 610 and thus a rotation range may be restrained as shown in the state of FIG. 7A.

Figure 9A:
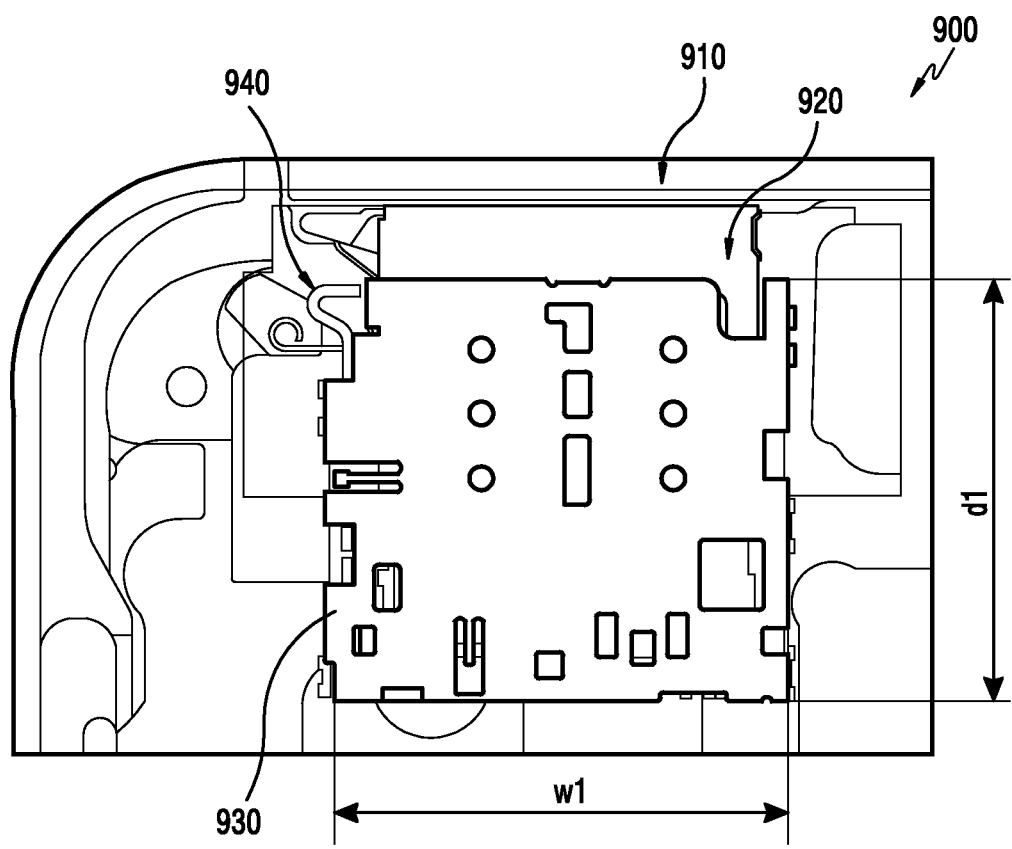
FIG. 9A and FIG. 9B illustrate a result of comparing sizes of a tray socket of a tray device according to various embodiments of the present disclosure and a tray socket according to a conventional technique.
Figure 9B:
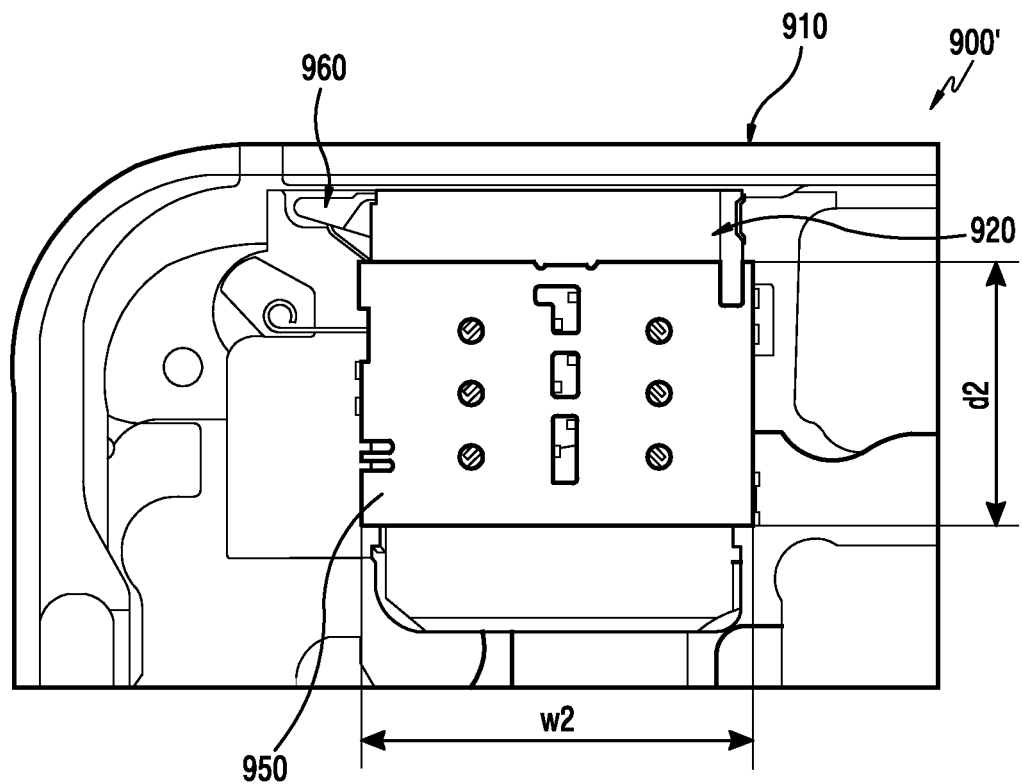

FIG. 9A and FIG. 9B illustrate a result of comparing sizes of a tray socket 950 of a tray device 900' according to various embodiments of the present disclosure and a tray socket 930 of a tray device 900 according to a conventional technique.

A tray 920 of FIG. 9A and FIG. 9B may be one exemplary embodiment of a tray similar to or different from the trays 320, 420, and 620 of FIG. 3A, FIG. 4A, and FIG. 6A.

FIG. 9A illustrates a state in which a tray fixing and unloading member 940 is disposed to the conventional tray socket 930, and FIG. 9B illustrates a state in which a tray fixing and unloading member 960 according to an exemplary embodiment of the present disclosure is disposed outside the tray socket 950. According to an embodiment, as shown in FIG. 9B, since the tray fixing and unloading member 960 is disposed outside the tray socket 950, a width w2 and length d2 of the tray socket 950 are significantly decreased in comparison with a width w1 and length d1 of the conventional tray socket 930. According to an embodiment, a size of the tray socket 950 may be minimize such that only at least one portion of the tray 910 can be contained, thereby contributing to make the electronic device slim.

Figure 10A:
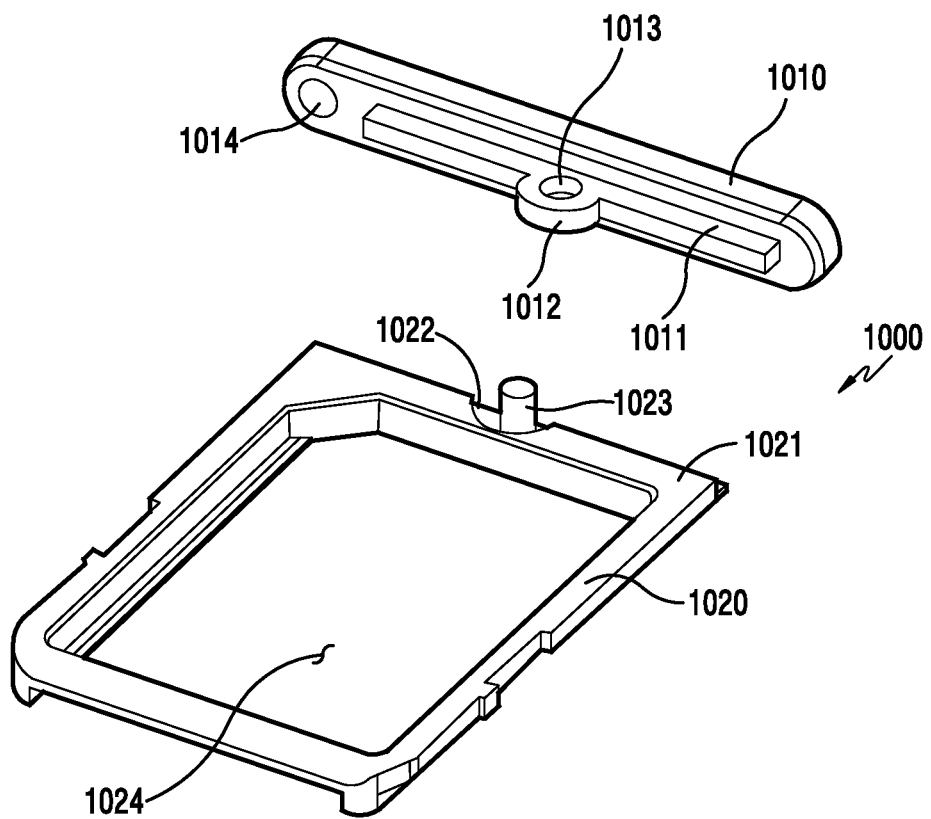
FIG. 10A to FIG. 10C illustrate a structure of a tray according to various embodiments of the present disclosure.
Figure 10B:
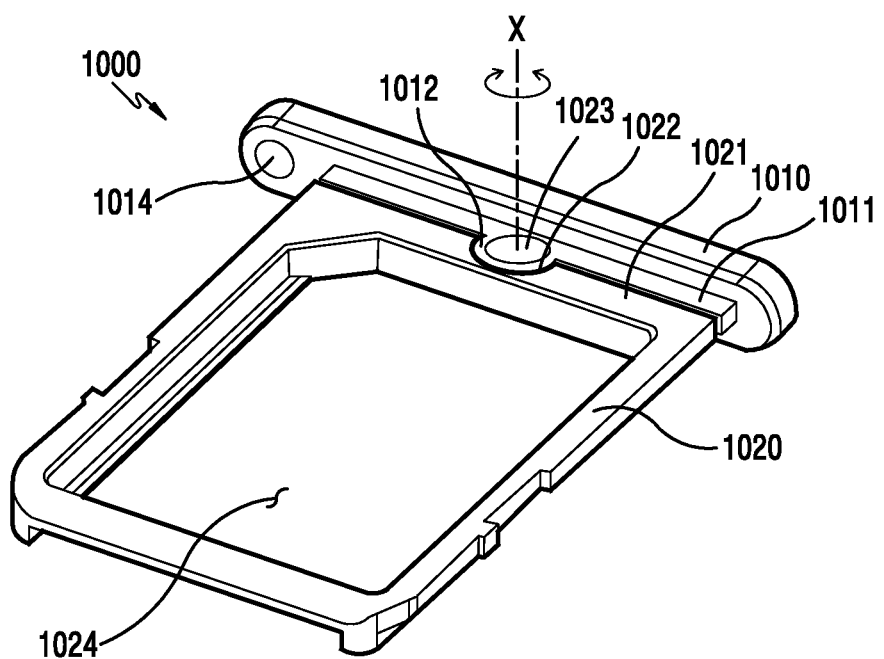
Figure 10C:
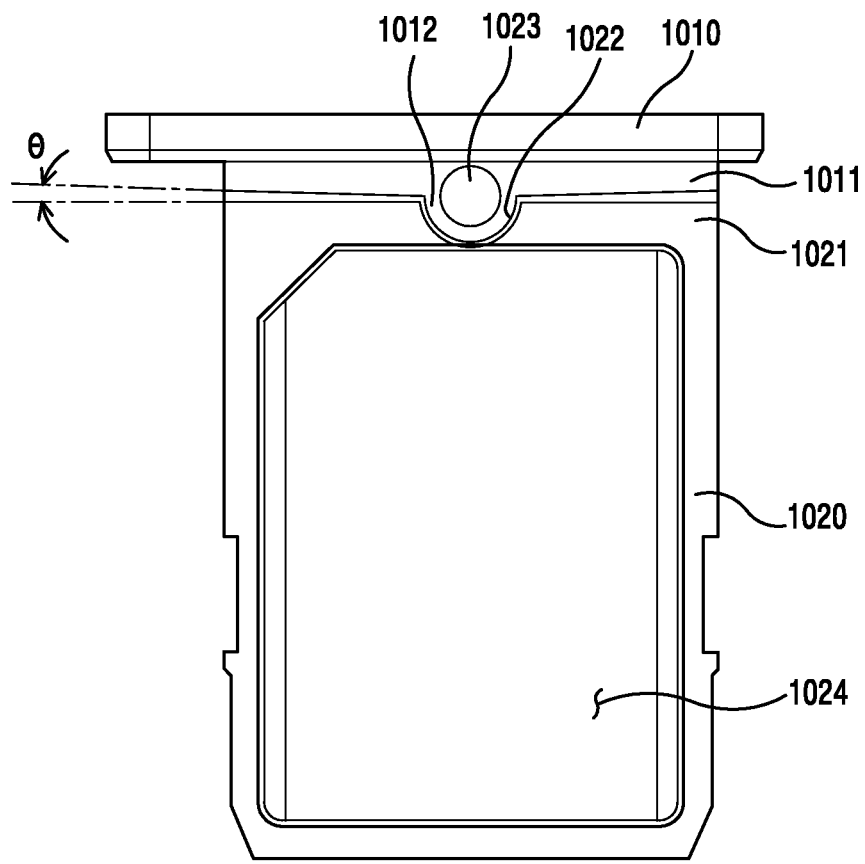

FIG. 10A to FIG. 10C illustrate a structure of a tray 1000 according to various embodiments of the present disclosure.

The tray 1000 of FIG. 10A to FIG. 10C may be an embodiment of a tray similar to or different from the trays 320, 420, 620, and 920 of FIG. 3, FIG. 4A, FIG. 6A, and FIG. 9A.

According to various embodiments, the aforementioned tray may consist of one component, whereas a tray socket to which the tray is placed may be formed by assembling a plurality of components such as a substrate (e.g., PCB), an external housing, or the like. Therefore, there may be a problem in that a tray inserting opening formed to the external housing and a mounting hole of a tray socket placed inside thereof have difficulty to be aligned with a correct position due to a component assembly tolerance, an SMD tolerance, or the like. For example, the tray may have difficulty to be inserted into the socket, or even if it is inserted, the tray may be eccentric to one side of the tray inserting opening of the external housing, which may result in deterioration of external appearance quality.

Referring to FIG. 10A to FIG. 10C, the tray 1000 may include a tray cover 1010 and a tray body 1020 installed in a rotatable manner in the tray cover 1010.

According to various embodiments, the tray cover 1010 may have a supporting rib 1011 formed in a lengthwise direction, and a hinge arm 1012 including a through-hole 1013 may be formed at a center of the supporting rib 1011. According to embodiment, a pin inserting hole 1014 may be formed at one side of the tray cover 1010. According to embodiment, after the tray 1000 is placed to the electronic device, the pin inserting hole 1014 may be used for penetrating a tray unloading pin to unload the tray.

According to various embodiments, the tray cover 1010 is a portion exposed to the outside of the electronic device when the tray 1000 is placed to the electronic device, and may have the same Color, Material, Finishing (CMF) such as the same material, the same color, or the like as an external housing of the electronic device.

According to various embodiments, the tray body 1020 may include an external component container 1024 for containing an external component (e.g., a card-type external device or the like). According to an embodiment, a hinge arm mounting portion 1022 capable of mounting the hinge arm 1012 may be formed to a rib joining portion 1021 corresponding to the tray cover 1010. According to an embodiment, a circular shaft 1023 may be extended upwardly in the hinge arm mounting portion 1022.

According to various embodiments, the tray cover 1010 may be coupled with the tray body 1020 in such a manner that the shaft 1023 penetrates the through-hole 1013 of the hinge arm 1012. According to an embodiment, the tray cover 1010 and the tray body 1020 may be disposed to mutually rotate with a specific angle θ to the left and the right by using an axis X of the shaft 1023 as a rotation axis. According to one exemplary embodiment, a mutual distance of the through-hole 1013 and the shaft 1023 penetrating the through-hole 1013 may maintain a rotatable interval. According to an embodiment, a distance between an internal circumferential surface of the through-hole 1013 and an external circumferential surface of the shaft 1023 may be designed to be less than or equal to 0.1 mm.

According to various embodiments, a surface corresponding to the supporting rib 1011 and/or the rib joining portion 1021 in contact with the supporting rib 1011 may be formed as an inclined surface having a specific angle. According to an embodiment, if the inclined surface is formed on the supporting rib 1011, the inclined surface may be formed to be tapered such that its height is lowered when its distance is increased to the left and the right about the hinge arm 1012. According to an embodiment, if the inclined surface is formed on the rib joining portion 1021, the inclined surface may be formed to be tapered such that its height is lowered to the left and the right about the hinge arm mounting portion 1022.

According to various embodiments, the inclined surface may contribute to determine a rotation angle θ by which the tray cover 1010 and the tray body 1020 rotate about the axis X as the rotation axis. According to an embodiment, the rotation angle θ may be designed within a range not exceeding 1.5 degrees.

According to an embodiment, the tray body 1020 or the tray cover 1010 rotates with respect to the tray cover 1010 or the tray body 1020, and thus, even if the tray 1000 is placed to a tray socket which is misaligned with the tray inserting opening of the electronic device, the inclined surface accepts the aforementioned error margin when the tray body 1020 moves to the left and the right. Therefore, the tray cover 1010 may be properly placed to the tray inserting opening of the electronic device.

According to various embodiments, a hinge arm including a through-hole may be formed on the tray body 1020, and a hinge arm mounting portion including a shaft to which the hinge arm is mounted may be formed on the tray cover 1010.

Figure 11A:
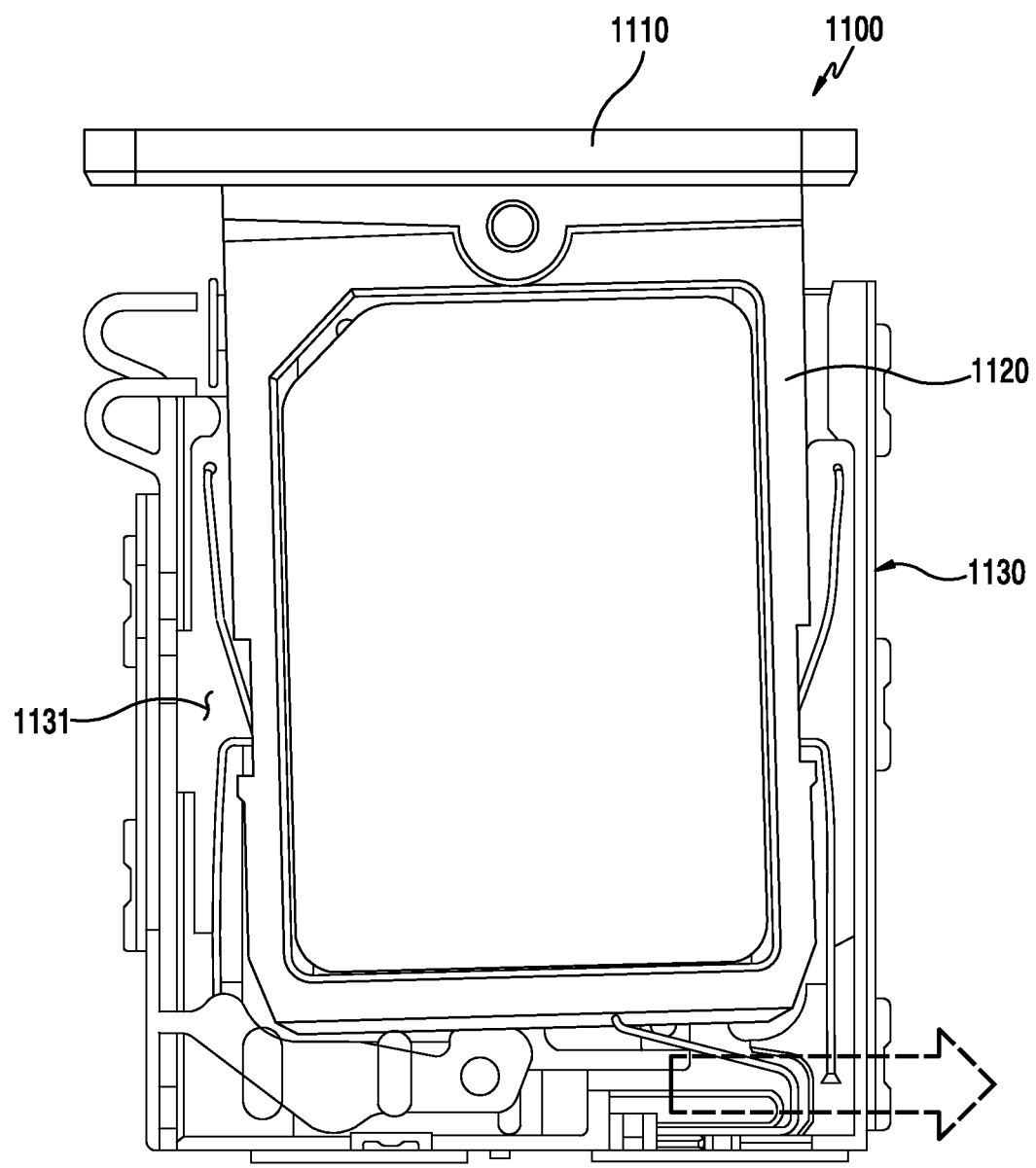
FIG. 11A and FIG. 11B illustrate a state in which a tray is placed with eccentricity to an electronic device according to various embodiments of the present disclosure.
Figure 11B:
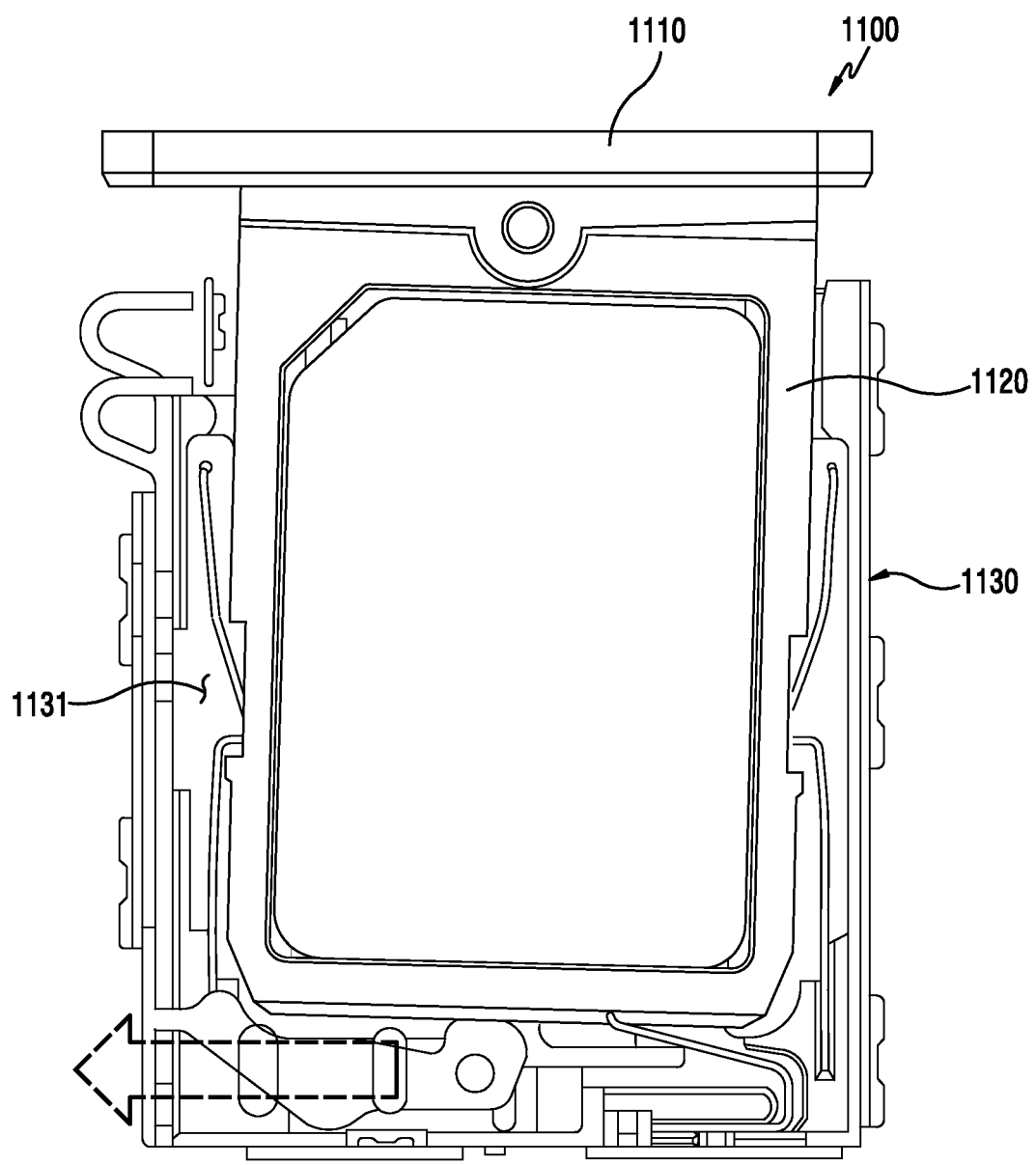

FIG. 11A and FIG. 11B illustrate a state in which a tray 1100 is placed with eccentricity to an electronic device according to various embodiments of the present disclosure.

The tray 1100 of FIG. 11A and FIG. 11B may be an embodiment of a tray similar to or different from trays 320, 420, 620, 920, and 1000 of FIG. 3, FIG. 4A, FIG. 6A, FIG. 9A, and FIG. 10A.

According to various embodiments, in a tray socket 1130 disposed inside the electronic device, a tray socket and a tray inserting opening formed to an external housing of the electronic device may not be aligned at a correct position due to an accumulative tolerance such as an SMD tolerance, a processing tolerance, an assembly tolerance, or the like with respect to a sub structure.

FIG. 11A and FIG. 11B illustrate a state in which the tray socket 1130 is placed eccentrically to the right or the left inside the electronic device (i.e., mounted on the substrate or placed to an inner space other than the substrate) with respect to a tray inserting opening of the electronic device.

Referring to FIG. 11A, when the tray socket 1130 is disposed eccentrically with a specific angle to the right inside the electronic device, the placed tray 1100 may be placed to the tray socket 1130 in a state where a tray body 1120 rotates with a specific angle to the right with respect to the tray cover 1110. In this case, the tray cover 1110 may be normally placed to the tray inserting opening formed to the external housing of the electronic device, irrespective of the eccentric tray socket 1130.

Referring to FIG. 11B, if the tray socket 1130 is disposed eccentrically with a specific angle to the left inside the electronic device, the placed tray 1100 may be placed to the tray socket 1130 in a state where the tray body 1120 rotates with a specific angle to the left with respect to the tray cover 1110. In this case, the tray cover 1110 may be normally placed to the tray inserting opening formed to the external housing of the electronic device, irrespective of the eccentric tray socket 1130.

According to various embodiments, a movable inclined angle between the tray cover 1110 and the tray body 1120 may be determined depending on an eccentric allowance amount. For example, if the eccentric allowance amount of the tray socket 1130 is ±0.2 mm, the movable inclined angle between the tray cover 1110 and the tray body 1120 may be 1.5 degrees. According to one exemplary embodiment, the eccentric allowance amount and a mutually moving angle of the tray cover 1110 and the tray body 1120 may be determined with various ratios according to an overall inner width of the tray socket 1130 and an internal gap depending on an overall width of the tray body.

Figure 12:
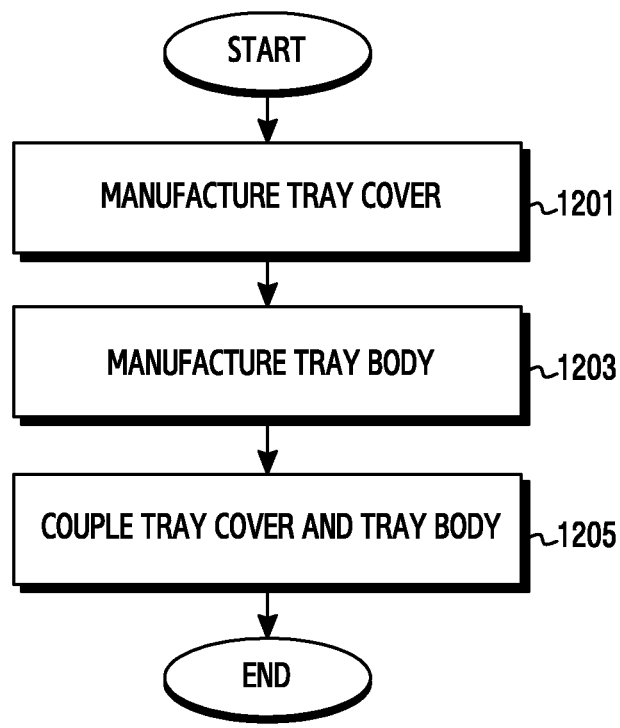
FIG. 12 is a flowchart that illustrates a tray manufacturing procedure according to various embodiments of the present disclosure.

FIG. 12 is a flowchart illustrating a tray manufacturing procedure according to various embodiments of the present disclosure.

Referring to FIG. 12, in operation 1201, a tray cover may be manufactured. According to an embodiment, the tray cover may be manufactured with metal, plastic, rubber, or the like, and if manufactured with the metal, it may be manufactured with a processing method such as diecasting, CNC processing, MIM, press, or the like by using a material such as Al, Mg, STS, metallic glass (e.g. liquid metal), or the like. If manufactured with the synthetic resin, it may be manufactured with a processing method such as injection, CNC processing, or the like by using a material such as PC, PC-GF, or the like. However, without being limited thereto, the tray cover may be manufactured variously by using a proper material and processing method.

In operation 1203, the tray body may be manufactured. According to an embodiment, the tray cover may be manufactured with metal, plastic, rubber, or the like, and if manufactured with the metal, it may be manufactured with a processing method such as diecasting, CNC processing, MIM, press, or the like by using a material such as Al, Mg, STS, metallic glass (e.g. liquid metal), or the like. If the tray is manufactured with the synthetic resin, it may be manufactured with a processing method such as injection, CNC processing, or the like by using a material such as PC, PC-GF, or the like. However, without being limited thereto, the tray cover may be manufactured variously by using a proper material and processing method.

According to various embodiments, the tray body may be manufactured with various materials and processing methods described above. According to an embodiment, the tray body may be formed of the same material as the tray cover or may be formed of different materials. According to an embodiment, if at least one portion of the external housing of the electronic device is used as an antenna radiator by being manufactured with a metal member, although the tray cover may be manufactured with metal which is the same material as the external housing (the tray cover may be used as one part of the antenna radiator, or a radiation pattern included in the tray cover may be used as the antenna radiator), the body may use a non-metallic material to decrease a deviation, thereby ensuring capability of the electronic device. According to an embodiment, if the external housing of the electronic device is manufactured with a non-metallic member, although the tray cover may be manufactured with the same non-metallic material as the external housing, the tray body may be manufactured with a non-metal or metal material. According to an embodiment, if the tray body is manufactured with the metal material, a fragment portion may be added by using an additional non-metallic material and thus may be utilized as another antenna. According to an embodiment, operations 1203 and 1201 may change the order.

In operation 1205, the manufactured tray cover and tray body may be assembled in a mutually rotatable manner. According to an embodiment, the tray body may be mounted to an additional assembly jig and thereafter a shaft extended to a hinge arm mounting groove may be allowed to penetrate through a through-hole of a hinge arm located in the tray cover, so that the tray body is assembled with the tray cover in a rotatable manner. According to an embodiment, the hinge arm of the tray cover and the shaft of the tray body may be coupled by using various well-known ways such as riveting, screw fastening, a mechanical joining structure, or the like.

Figure 13A:
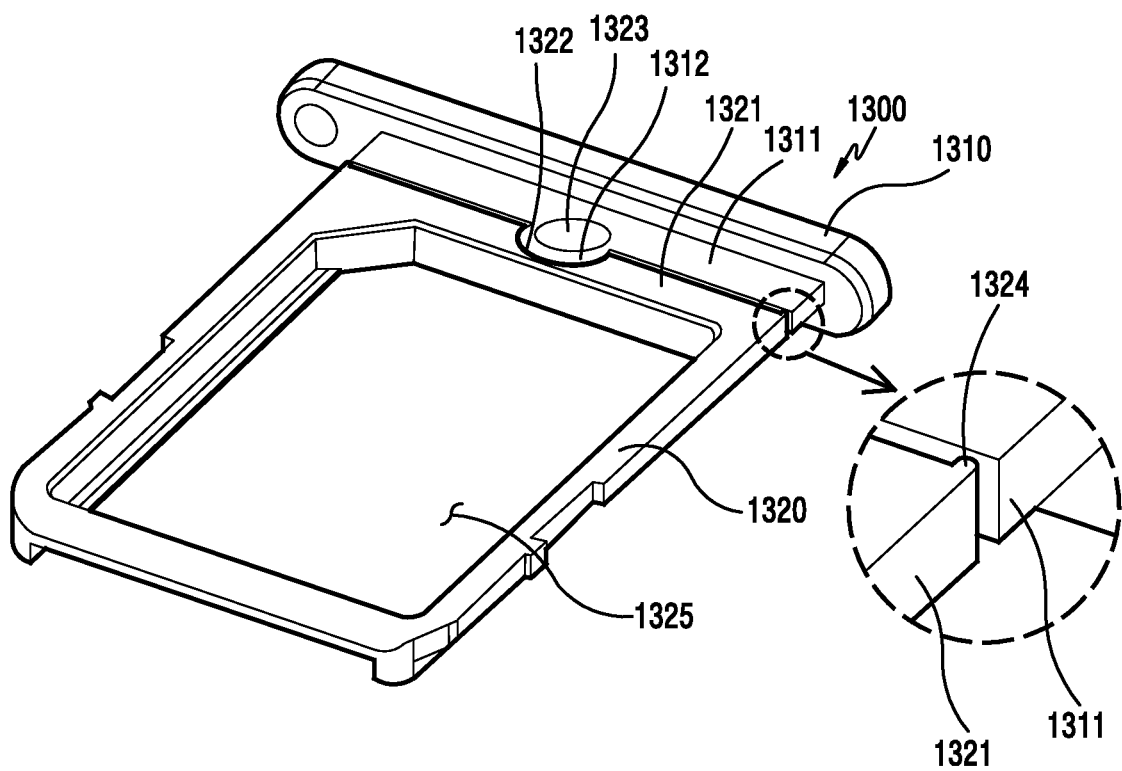
FIG. 13A and FIG. 13B illustrate a structure of a tray according to various embodiments of the present disclosure.
Figure 13B:
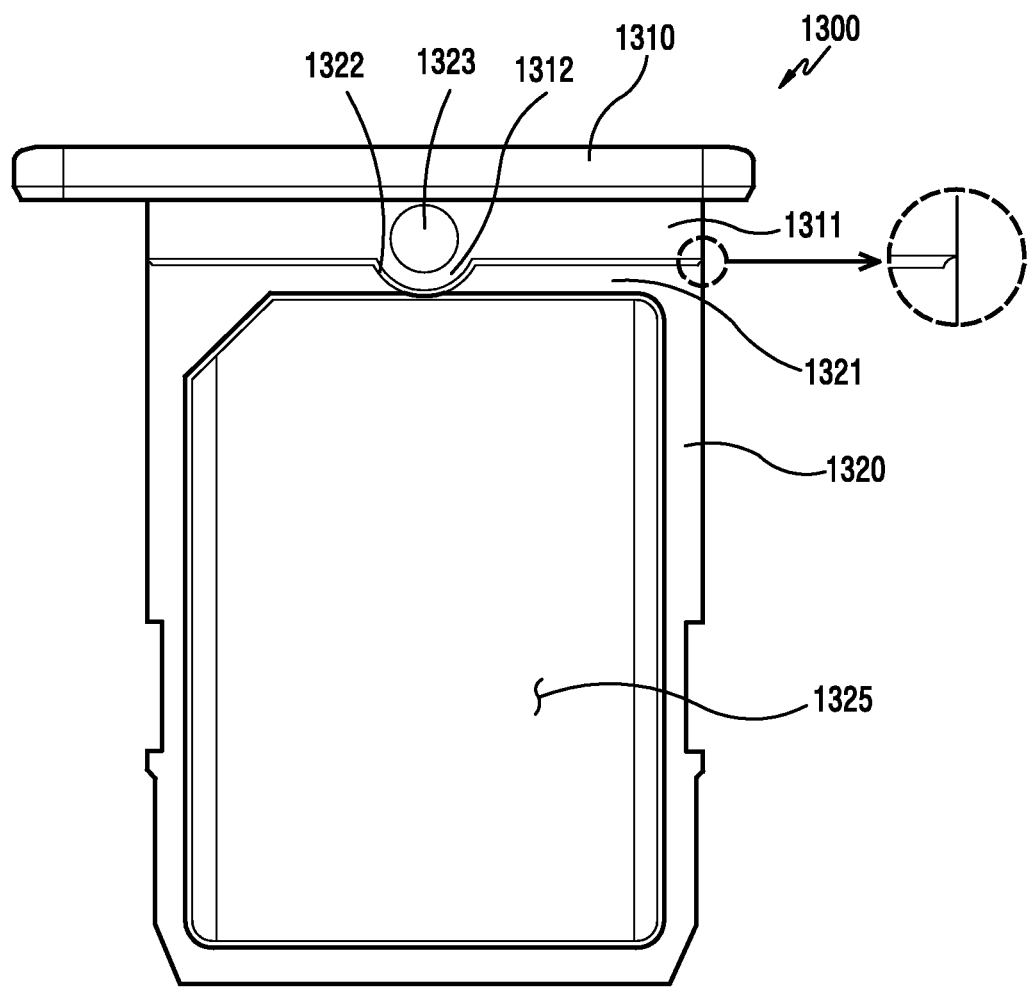

FIG. 13A and FIG. 13B illustrate a structure of a tray 1300 according to various embodiments of the present disclosure.

The tray 1300 of FIG. 13A and FIG. 13B may be an embodiment of a tray similar to or different from the trays 320, 420, 620, 920, 1000, and 1100 of FIG. 3, FIG. 4A, FIG. 6A, FIG. 9A, FIG. 10A, and FIG. 11A.

A structure in which a tray cover 1310 and tray body 1320 of FIG. 13A and FIG. 13B are installed in a mutually rotatable manner may be the same as the structure of FIG. 10A to FIG. 10C. According to an embodiment, since a hinge arm 1312 formed on a supporting rib 1311 of the tray cover 1310 is placed in a rotatable manner to a hinge arm mounting groove 1322 formed on a rib joining portion 1321 of the tray body 1320, the tray cover 1310 and the tray body 1320 may be coupled in a mutually rotatable manner with a specific angle.

According to various embodiments, a stopper 1324 may be formed in a protruding manner in a facing direction of the supporting rib 1311 of the tray cover 1310 at both left and right ends of the rib joining portion 1321 of the tray body 1320. According to an embodiment, when the tray cover 1310 rotates in a specific angle and thereafter is in contact with a surface of the supporting rib 1311, a rotation angle of the stopper 1324 may be restricted.

According to various embodiments, the stopper 1324 may be formed on a surface facing the rib joining portion 1321 of the supporting rib 1311 instead of the rib joining portion 1321 of the stopper 1324, or may be formed on both of the rib joining portion 1321 and the supporting rib 1311.

Figure 14A:
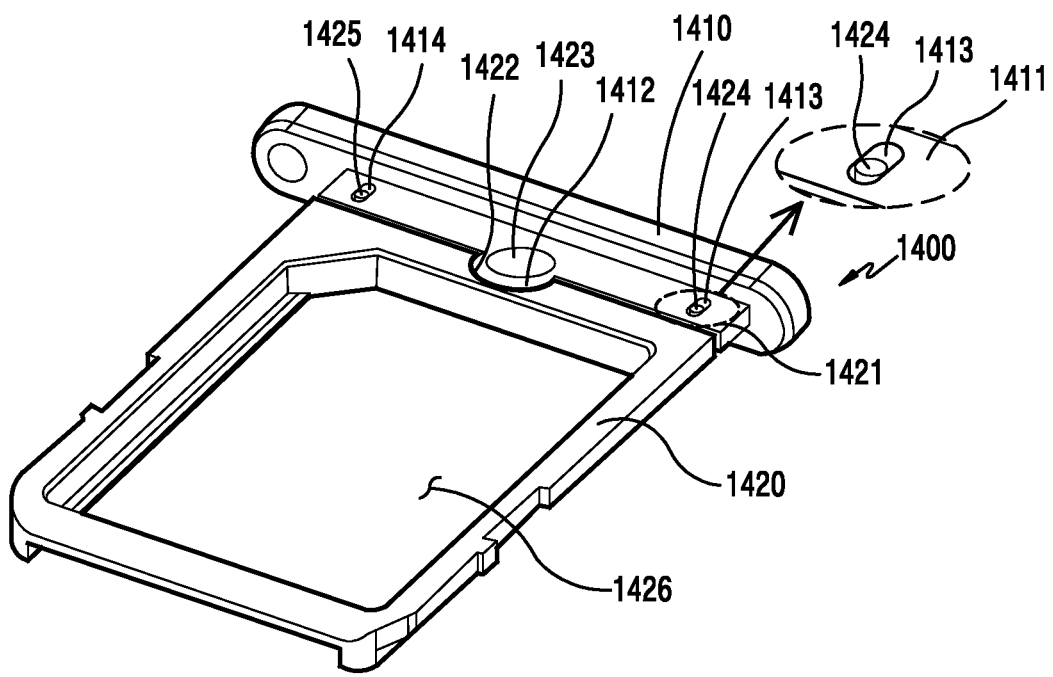
FIG. 14A and FIG. 14B illustrate a structure of a tray according to various embodiments of the present disclosure.
Figure 14B:
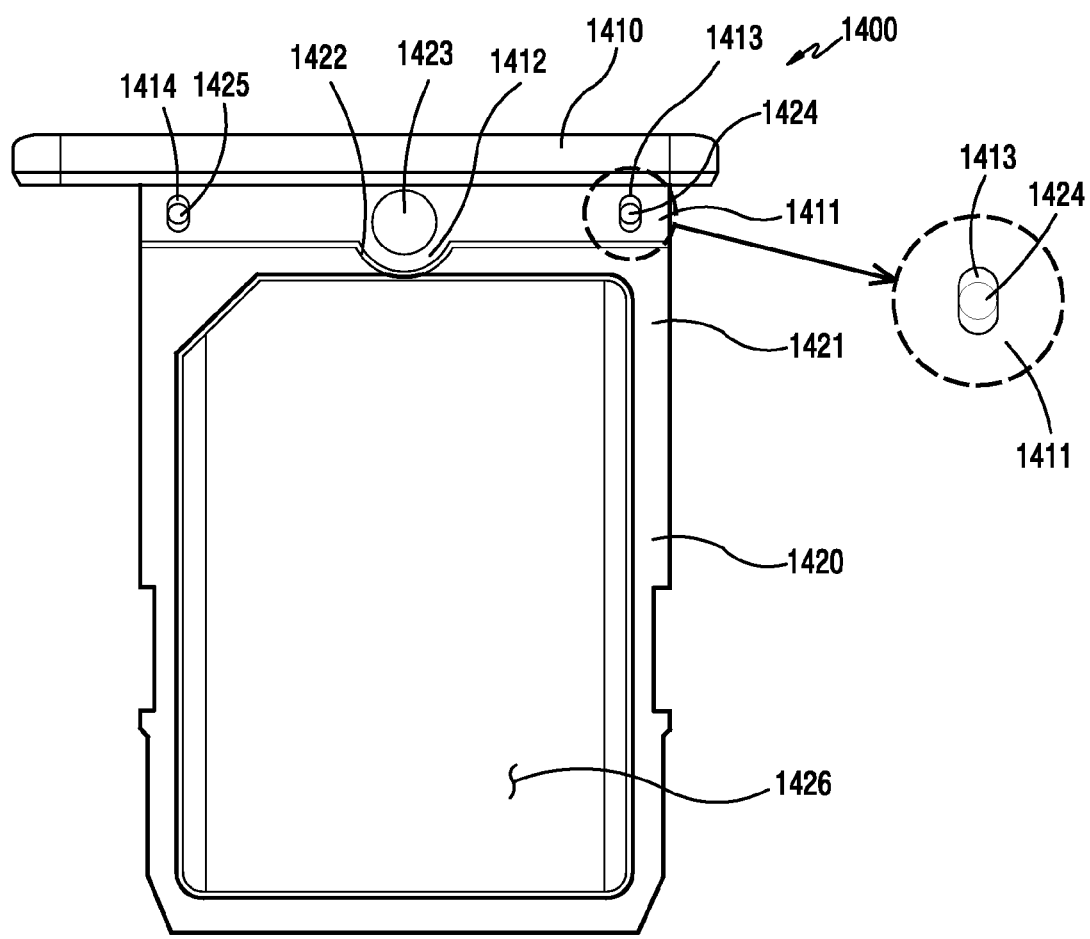

FIG. 14A and FIG. 14B illustrate a structure of a tray 1400 according to various embodiments of the present disclosure.

The tray 1400 of FIG. 14A and FIG. 14B may be one example of a tray similar to or different from the trays 320, 420, 620, 920, 1000, 1100, and 1300 of FIG. 3, FIG. 4A, FIG. 6A, FIG. 9A, FIG. 10A, FIG. 11A, and FIG. 13A.

A structure in which a tray cover 1410 and tray body 1420 of FIG. 14A and FIG. 14B are installed in a mutually rotatable manner may be the same as the structure of FIG. 10A to FIG. 10C. According to an embodiment, since a hinge arm 1412 formed on a supporting rib 1411 of the tray cover 1410 is placed in a rotatable manner to a hinge arm mounting groove 1422 formed on a rib joining portion 1421 of the tray body 1420, the tray cover 1410 and the tray body 1420 may be coupled in a mutually rotatable manner with a specific angle.

According to various embodiments, a long hole 1413 having a length in a tray placing direction may be formed at both left and right ends of the supporting rib 1411 of the tray cover 1410. According to an embodiment, an engaging protrusion 1424 protruding upwardly may be formed at both ends of the rib joining portion 1421 of the tray body 1420, and if the tray body 1420 is coupled in a rotatable manner with the tray cover 1410 of the tray body 1420, the engaging protrusion 1424 may be inserted to the long hole 1413. According to an embodiment, the long hole 1413 may be formed in a shape of a curve having the same arc as a curve of an arc which is drawn while the tray cover 1410 and the tray body 1420 rotate.

According to various embodiments, when the tray cover 1410 and the tray body 1420 mutually rotate, the engaging protrusion 1424 of the rib joining portion 1421 may move under the guidance of the long hole 1413 of the supporting rib 1411. According to an embodiment, in this case, a rotation angle of the tray cover 1410 and the tray body 1420 may be determined depending on the length of the long hole 1413.

According to various embodiments, the engaging protrusion may be formed on the supporting rib 1411 of the tray cover 1410, and the long hole may be formed to guide after the engaging protrusion is mounted on the rib joining portion 1421 of the tray body 1420.

Figure 15A:
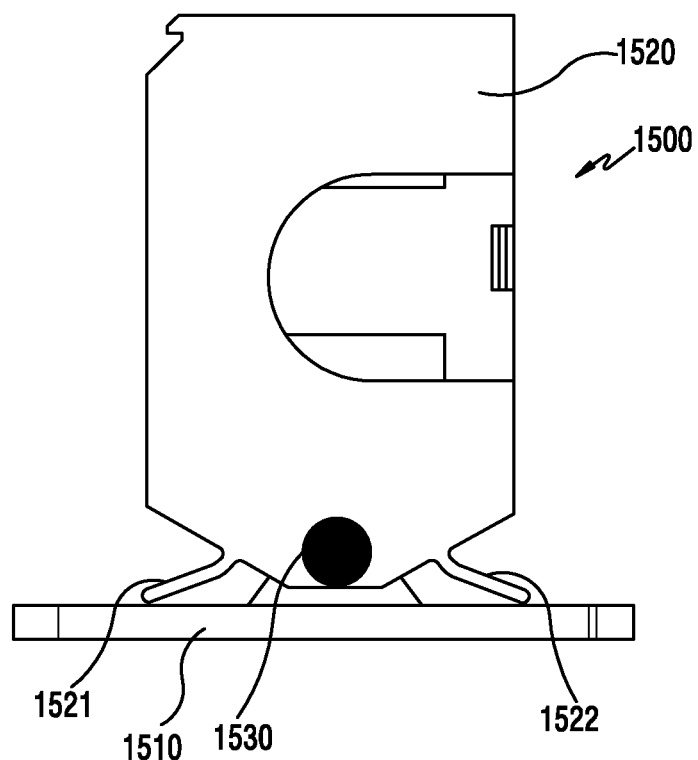
FIG. 15A and FIG. 15B illustrate a structure of a tray according to various embodiments of the present disclosure.
Figure 15B:
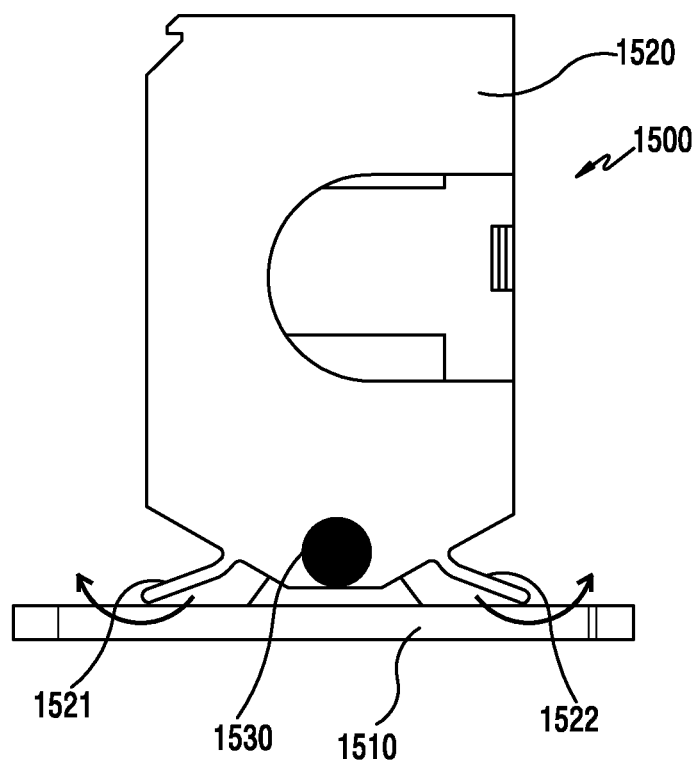

FIG. 15A and FIG. 15B illustrate a structure of a tray 1500 according to various embodiments of the present disclosure.

The tray 1500 of FIG. 15A and FIG. 15B may be an embodiment of a tray similar to or different from the trays 320, 420, 620, 920, 1000, 1100, 1300, and 1400 of FIG. 3, FIG. 4A, FIG. 6A, FIG. 9A, FIG. 10A, FIG. 11A, FIG. 13A, and FIG. 14A.

Referring to FIG. 15A and FIG. 15B, the tray 1500 may include a tray cover 1510 and a tray body 1520 disposed in a rotatable manner about a rotation axis 1530 in the tray cover 1510. According to an embodiment, the tray body 1520 may have tension ribs 1521 and 1522 disposed at both left and right ends about the rotation axis 1530. According to an embodiment, respective end portions of the tension ribs 1521 an 1522 may be disposed in a manner of supporting an inner surface of the tray cover 1520, and if the tray cover 1510 rotates about the rotation axis 1530, a shape thereof may be changed while having tension.

According to various embodiments, if the tray body 1520 is formed of a metal member (e.g., SUS or the like), the tension ribs 1521 and 1522 may be formed in an integral manner with the tray body 1520. According to an embodiment, the tension ribs 1521 and 1522 may be installed separately to the tray body 1520 to support the tray cover 1510.

Figure 16:
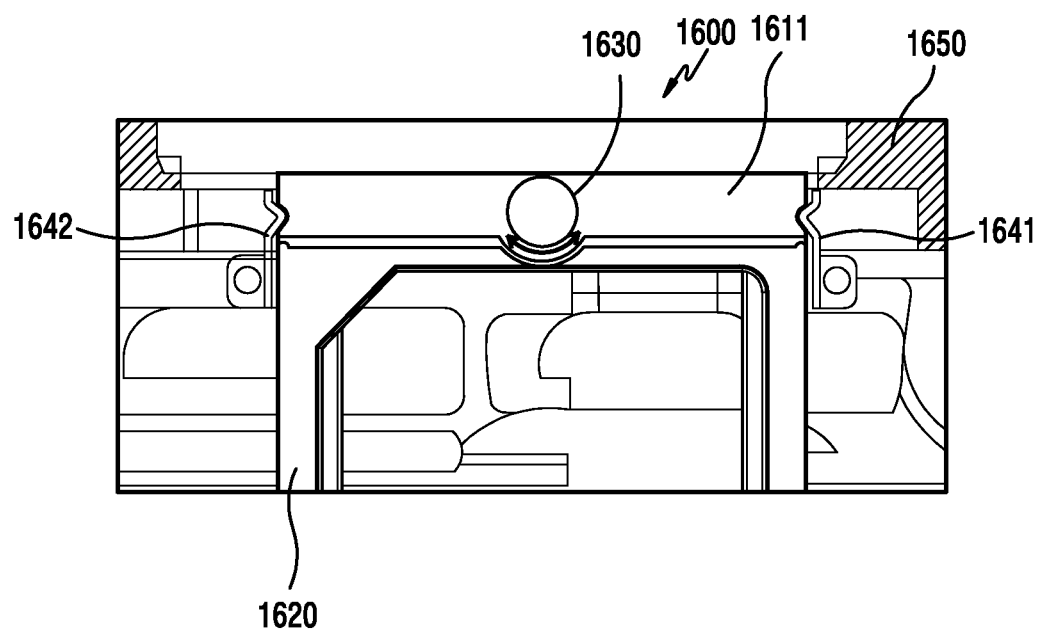
FIG. 16 and FIG. 17 illustrate a fixing structure in which a tray cover of a tray is fixed to an external housing of an electronic device according to various embodiments of the present disclosure.
Figure 17:
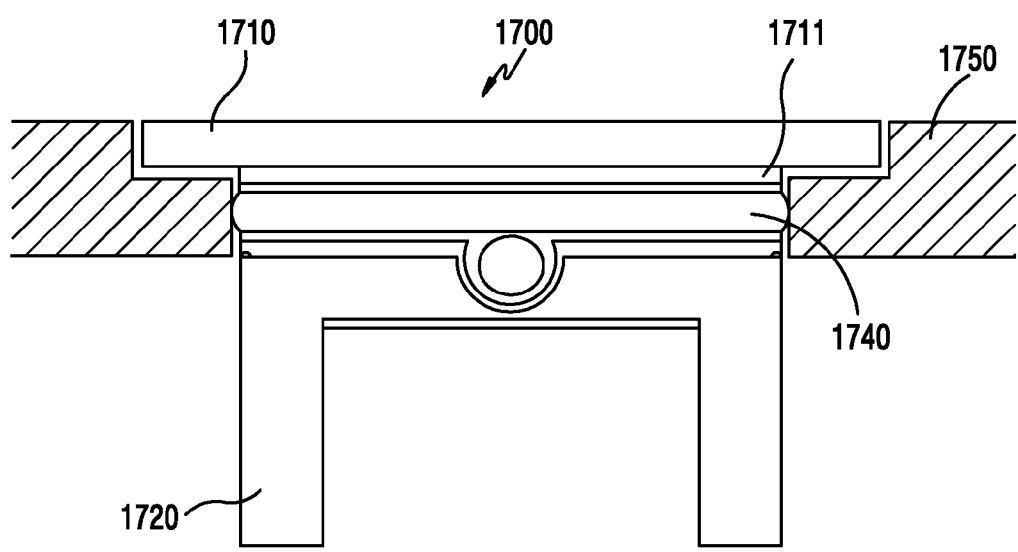

FIG. 16 and FIG. 17 illustrate a fixing structure in which tray covers 1610 and 1710 of trays 1600 and 1700 are fixed to external housings 1650 and 1750 of an electronic device according to various embodiments of the present disclosure.

The trays 1600 and 1700 of FIG. 16 and FIG. 17 may be an embodiment of a tray similar to or different from the trays 320, 420, 620, 920, 1000, 1100, 1300, 1400, and 1500 of FIG. 3, FIG. 4A, FIG. 6A, FIG. 9A, FIG. 10A, FIG. 11A, FIG. 13A, FIG. 14A, and FIG. 15A.

According to various embodiments, since the tray cover and the tray body are installed in a mutually movable manner, the tray may randomly move in a state where the tray cover is placed to the external housing with respect to the tray body fixed to the tray socket. Therefore, a fixing means may be required to fix the tray cover.

Referring to FIG. 16, the tray 1600 placed to the external housing 1650 may be placed in such a manner that a tray body 1620 is inserted into the electronic device and the tray cover 1610 is exposed to the external housing 1650. According to an embodiment, the tray cover 1610 placed to the external housing 1650 may be fixed to the external housing 1650 in a manner of pressing both side surfaces of a supporting rib 1611 of the tray cover 1610 by one pair of fixing pieces 1641 and 1642 disposed inside the electronic device. According to an embodiment, the fixing pieces 1641 and 1642 may be fixed in a manner of placing to a groove formed on both side surfaces of the supporting rib 1611.

Referring to FIG. 17, the tray 1700 placed to the external housing 1750 may be placed in such a manner that a tray body 1720 is inserted into the electronic device and the tray cover 1710 is exposed to the external housing 1750. According to an embodiment, the tray cover 1710 placed to the external housing 1750 may include an elastic member 1740 disposed in a manner of surrounding an outer circumferential surface of a supporting rib 1711 extended from the tray cover 1710. According to an embodiment, when the tray 1700 is inserted into the external housing 1750, since the elastic member 1740 is tightly inserted to an inner surface of the external housing 1750, the tray cover 1710 may be fixed in the external housing 1750 without movement. According to an embodiment, the elastic member 1740 may be formed of a rubber material, a urethane material, or a silicon material.

According to various embodiments, a fixing structure in which a tray is fixed inside an electronic device and an unloading structure in which the tray is unloaded are implement together, thereby contributing to make the device slim. Further, since a tray cover moves in a rotatable manner in a tray body, the tray can be prevented from being detached erroneously due to a manufacturing tolerance, and the electronic device may be facilitated to have a good external appearance.

According to various embodiments, an electronic device may include a housing including a first surface, a second surface facing an opposite direction of the first surface, and a side surface at least partially surrounding a space between the first surface and the second surface, an opening formed to one portion of the side surface of the housing, a hole connected to the opening, a tray including a first side surface, a second side surface facing an opposite direction of the first side surface, a third side surface extended between the first side surface and the second side surface, and a fourth side surface facing an opposite direction of the third side surface and extended between the first side surface and the second side surface, having a length capable of being entirely inserted into the hole, and detachable from the hole, and a first fixing structure disposed inside the hole actually in parallel with the first side surface and/or second side surface of the tray, and configured to be at least partially rotatable about an axis in a first direction facing the outside of the hole. The tray may be configured such that, if inserted entirely into the hole, at least one portion of the tray is in contact with the first fixing structure, and the second side surface of the tray is aligned with actually the same surface of another portion of the side surface of the housing, and if the first fixing structure at least partially rotates in the first direction, the tray is released from the hole.

According to various embodiments, if the tray is entirely inserted into the hole, the tray may be configured to be capable of exerting a retaining force at various positions on the tray to maintain the alignment for various lengths of a manufacturing distance.

According to various embodiments, the manufacturing distance may include a distance between the second side surface of the tray and another portion of the side surface of the housing or a distance between the tray and an inner surface of the hole.

According to various embodiments, if the tray is entirely inserted into the hole, at least one portion of the first side surface of the tray may be in contact with the first fixing structure.

According to various embodiments, the electronic device may include at least one protrusion configured to protrude from the at least one portion inside the hole so as to restrict the rotation of the first fixing structure.

According to various embodiments, the third side surface of the tray may include a groove, and if the tray is entirely inserted into the hole, at least one portion of the first fixing structure may be inserted into the groove.

According to various embodiments, the electronic device may further include a second fixing structure disposed inside the hole in a lengthwise direction of the hole. The fourth side surface of the tray may include a groove, and if the tray is entirely inserted into the hole, at least one portion of the second fixing structure may be inserted into the groove.

According to various embodiments, the tray may be configured to be capable of placing at least one card-type external device.

According to various embodiments, the tray may include at least one opening. The at least one card-type external device may be configured to be capable of being placed inside the at least one opening of the tray.

According to various embodiments, the electronic device may include a first conductive pattern disposed inside the hole. The at least one card-type external device may include a second conductive pattern disposed to one surface of the at least one card-type external device. When the at least one card-type external device is placed inside the at least one opening of the tray, the first conductive pattern and the second conductive pattern may be disposed to be in contact with each other.

According to various embodiments, the tray may include a first portion including the second side surface and disposed inside the opening of the housing, and a second portion including the first side surface and configured to be capable of placing the at least one card-type external device. One of the first portion or the second portion may have an opening, the other may have a protrusion, and the first portion and the second portion may be coupled with each other by the opening and the protrusion. The first portion and/or the second portion may be configured to be at least partially rotatable about an axis of the protrusion.

According to various embodiments, an electronic device may include a housing including a first surface, a second surface facing an opposite direction of the first surface, and a side surface at least partially surrounding a space between the first surface and the second surface, an opening formed to one portion of the side surface of the housing and connected to the space, a tray including a groove capable of inserting a memory card and/or a Subscriber Identification Module (SIM) card, and having a structure and size capable of being inserted into the space through the opening, and a structure including a first portion for holding the tray when the tray is inserted into the space through the opening, and a second portion formed integrally with the first portion to release the tray from the space by pushing the tray due to a pivot movement.

According to various embodiments, an electronic device may include a housing including a first surface, a second surface facing an opposite direction of the first surface, and a side surface at least partially surrounding a space between the first surface and the second surface, an opening formed to one portion of the side surface of the housing and connected to the space, a tray including a groove capable of inserting a memory card and/or a Subscriber Identification Module (SIM) card, and having a structure and size capable of being inserted into the space through the opening, and a structure including a first portion for holding the first side surface of tray when the tray is inserted into the space through the opening, and a second portion formed integrally with the first portion to release the tray from the space by pushing the tray due to a pivot movement.

According to various embodiments, the rotation member may rotate when the first portion is pressed in a tray placing direction by a tray unloading pin to be inserted through a pin inserting hole formed to the tray.

According to various embodiments, a restoring force may be offered to the rotation member due to a pressing force for pressing the first portion in a direction opposite to the tray placing direction by an elastic member to be disposed inside the housing.

According to various embodiments, the second portion may be restrained by a support protrusion to be disposed inside the housing, and thus a rotation amount of the rotation member may be restricted.

According to various embodiments, an engaging member for holding the second side surface facing the first side surface of the tray may be disposed inside the housing. The placed tray may be held simultaneously by the rotation member and the engaging member.

According to various embodiments, the tray may be configured to be capable of placing at least one card-type external device.

According to various embodiments, the tray may include at least one opening. The at least one card-type external device may be configured to be capable of being placed inside at least one opening of the tray.

According to various embodiments, the tray may be unloaded to the outside of the electronic device when a second portion of the rotation member pushes an end portion of the tray or pushes an engaging recess formed to the tray.

Although the present disclosure has been described with various exemplary embodiments, various changes and modifications may be suggested to one skilled in the art. It is intended that the present disclosure encompass such changes and modifications as fall within the scope of the appended claims.

What is claimed is:

1. An electronic device comprising:
   a housing comprising a first surface, a second surface facing an opposite direction of the first surface, a side surface at least partially surrounding a space between the first surface and the second surface, an opening formed to a portion of the side surface and a hole connected to the opening;
   a tray comprising a first side surface, a second side surface facing an opposite direction of the first side surface, a third side surface extending between the first side surface and the second side surface, and a fourth side surface facing an opposite direction of the third side surface and extending between the first side surface and the second side surface, the tray having a length capable of being entirely inserted into the hole, and detachable from the hole; and
   a first fixing structure disposed inside the hole, the first fixing structure comprising a lever, wherein the lever is configured to be:
   positioned in parallel with at least one of the first side surface or the second side surface of the tray, and
   at least partially rotatable about an axis in a first direction facing the outside of the hole,
   wherein the tray comprises a first engaging groove formed in the third side surface, and is inserted entirely into the hole, and the first engaging groove is in contact with the lever,
   wherein the second side surface of the tray is aligned with the same surface of another portion of the side surface of the housing, and
   wherein the tray is released from the hole, when the lever at least partially rotates in the first direction,
   wherein the lever comprises a first end portion including a lever engaging portion extended to the first engaging groove and engaged by the first engaging grove when the tray is inserted into the hole, and a second end portion pressing the tray when the tray is released from the hole,
   wherein the first end portion and the second end portion of the lever are formed as a single unitary body,
   wherein the first end portion includes a stopper portion formed in an opposite direction of the lever engaging portion; and wherein the lever engaging portion and the stopper portion of the first end portion are formed as a single unitary body.

2. The electronic device of claim 1, wherein when the tray is inserted entirely into the hole, the tray is configured to be capable of exerting a retaining force at various positions on the tray to maintain an alignment for various lengths of a manufacturing distance.

3. The electronic device of claim 2, wherein the manufacturing distance comprises a distance between the second side surface of the tray and another portion of the side surface of the housing or a distance between the tray and an inner surface of the hole.

4. The electronic device of claim 1, wherein when the tray is inserted entirely into the hole, at least one portion of the first side surface of the tray is in contact with the lever.

5. The electronic device of claim 1, wherein the electronic device comprises at least one protrusion configured to protrude from the at least one portion of the tray inside the hole so as to restrict a rotation of the first fixing structure.

6. The electronic device of claim 1, further comprising a second fixing structure disposed inside the hole in a lengthwise direction of the hole,
   wherein the fourth side surface of the tray comprises a second groove, and
   wherein when the tray is inserted entirely into the hole, at least one portion of the second fixing structure is inserted into the second groove.

7. The electronic device of claim 1, wherein the tray is configured to receive at least one card-type external device.

8. The electronic device of claim 7,
   wherein the tray comprises at least one opening and is configured to receive the at least one card-type external device.

9. The electronic device of claim 8,
   wherein the electronic device comprises a first conductive pattern disposed inside the hole, and
   wherein when the tray receives the at least one card-type external device that is placed inside the at least one opening of the tray, the first conductive pattern is positioned to form an antenna by contacting a second conductive pattern disposed on the at least one card-type external device.

10. The electronic device of claim 7, wherein the tray comprises:
    a first portion comprising the second side surface and disposed inside the opening of the housing; and
    a second portion comprising the first side surface and configured to receive the at least one card-type external device,
    wherein one of the first portion or the second portion has an opening, the other has a protrusion, and the first portion and the second portion are coupled with each other by the opening and the protrusion, and
    wherein at least one of the first portion or the second portion is configured to be at least partially rotatable about an axis of the protrusion.

11. The electronic device of claim 1
    wherein the lever comprising a rotation member, and
    wherein the tray is released from the hole by pushing the tray due to a pivot movement of the rotation member.

12. The electronic device et claim 11, wherein the rotation member rotates when the first portion of the lever is pressed in a tray placing direction by a tray unloading pin to be inserted through a pin inserting hole formed to the tray.

13. The electronic device of claim 12, wherein a restoring force is offered to the rotation member due to a pressing force for pressing the first portion of the lever in a direction opposite to the tray placing direction by an elastic member to be disposed inside the housing.

14. The electronic device of claim 13, wherein the second portion of the lever is restrained by a support protrusion to be disposed inside the housing, and thus a rotation amount of the rotation member is restricted.

15. The electronic device of claim 11,
wherein an engaging member configured to hold a second side surface facing the first side surface of the tray is disposed inside the housing and
wherein the tray is configured to be held simultaneously by the rotation member and the engaging member.

16. The electronic device of claim 11, wherein the tray is configured to be unloaded to the outside of the electronic device when a second portion of the rotation member pushes one of an end portion of the tray or an engaging recess formed to the tray.

* * * * *